(12) United States Patent
Kim et al.

(10) Patent No.: US 7,398,268 B2
(45) Date of Patent: Jul. 8, 2008

(54) SYSTEMS AND METHODS THAT FACILITATE DATA MINING

(75) Inventors: Pyungchul Kim, Sammamish, WA (US); ZhaoHui Tang, Bellevue, WA (US); Ioan Bogdan Crivat, Redmond, WA (US); C. James MacLennan, Redmond, WA (US); Raman S. Iyer, Redmond, WA (US); Irina G. Gorbach, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 11/049,031

(22) Filed: Feb. 2, 2005

(65) Prior Publication Data

US 2006/0010110 A1    Jan. 12, 2006

Related U.S. Application Data

(60) Provisional application No. 60/586,500, filed on Jul. 9, 2004.

(51) Int. Cl.
*G06F 17/30* (2006.01)
(52) U.S. Cl. ................... 707/3; 705/1; 705/35
(58) Field of Classification Search ........... None
See application file for complete search history.

(56) References Cited

U.S. PATENT DOCUMENTS

2004/0010505 A1* 1/2004 Vishnubhotla ......... 707/100
2004/0249867 A1* 12/2004 Kraiss et al. ............ 707/203
2004/0250255 A1* 12/2004 Kraiss et al. ............ 719/310
2005/0039166 A1   2/2005 Betts et al.
2005/0154748 A1* 7/2005 Kraiss ..................... 707/102

OTHER PUBLICATIONS

Zukerman, et al. "Predictive Statistical Modelsfor User Modeling," 2001. Kluwer Academic Publishers, pp. 5-18.
Ko, et al. "Designing the Whyline: A Debugging Interface for Asking Questions About Program Behaviour," Apr. 24, 2004. ACM, pp. 151-158.
Kohsuke Kawaguchi. "The JAXB API," Jan'08, 2003. XML.com, pp. 1-7. <http://www.xml.com/pub/a/2003/01/08/jaxb-api.html>.

* cited by examiner

*Primary Examiner*—Hosain T Alam
*Assistant Examiner*—Azam Cheema
(74) *Attorney, Agent, or Firm*—Amin, Turocy & Calvin, LLP

(57) ABSTRACT

A system that facilitates data mining comprises a reception component that receives command(s) in a declarative language that relate to utilizing an output of a first data mining model as an input to a second data mining model. An implementation component analyzes the received command(s) and implements the command(s) with respect to the first and second data mining models. In another aspect of the subject invention, the reception component can receive further command(s) in a declarative language with respect to causing one or more of the first and second data mining models to output a prediction, the prediction desirably generated without prediction input, the implementation component causes the one or more of the first and second data mining models to output the prediction.

16 Claims, 15 Drawing Sheets

SYSTEMS AND METHODS THAT FACILITATE DATA MINING

REFERENCE TO RELATED APPLICATIONS

This application claims the benefit of U.S. Provisional Application Ser. No. 60/586,500 filed on Jul. 9, 2004, and entitled SYSTEMS AND METHODS OF FACILITATING DATA MINING. This application is also related to U.S. patent application Ser. No. 11/032,960, filed on Jan. 11, 2005. The entireties of these applications are incorporated herein by reference.

TECHNICAL FIELD

The subject invention relates generally to computer software development, and more particularly to generation of predictions utilizing data mining models and training such data mining models.

BACKGROUND OF THE INVENTION

Computers and computer-based devices have become a necessary tool for many applications throughout the world. Typewriters and slide rules have become obsolete in light of keyboards coupled with sophisticated word-processing applications and calculators that include advanced mathematical functions/capabilities. Thus, trending applications, analysis applications, and other applications that previously may have required a collection of mathematicians or other high-priced specialists to painstakingly complete by hand can now be accomplished through use of computer technology. For instance, due to ever-increasing processor and memory capabilities, if data is entered properly into an application/wizard, such application/wizard can automatically output a response nearly instantaneously (in comparison to hours or days generating such response by hand previously required).

Furthermore, through utilization of computers and computer-related devices, vast magnitudes of data can be obtained for analysis and predictive purposes. For example; a retail sales establishment can employ a data analysis application to track sales of a particular good given a particular type of customer, income level of customers, a time of year, advertising strategy, and the like. More particularly, patterns within collected data can be determined and analyzed, and predictions relating to future events can be generated based upon these patterns. While the above example describes utilizing data in connection with retail sales, it is understood that various applications and contexts can benefit from analysis of accumulated data.

The aforementioned analysis of data, recognition of patterns, and generation of predictions based at least in part upon the recognized patterns can be collectively referred to as data mining. Conventionally, to enable suitable data mining, various models must be programmed and trained by way of training data. For instance, data previously collected can be employed as training data for one or more data mining models. The data mining models can employ various decision tree structures to assist in generating predictions, and can further utilize suitable clustering algorithms to cluster data analyzed by the data mining models. Accordingly, these data mining models can be extremely complex and require significant programming from an expert computer programmer.

Due to complexity of data mining models and extensiveness of computations utilized in connection with such data mining models, there currently exists various deficiencies associated therewith. For example, once data mining models are created and applied to a particular context, it can be extremely difficult to alter such data mining models. In particular, disparate data mining models can be created to generate predictions relating to particular contexts and/or applications, where at the time of creation of such data mining models it was believed that the models were not substantially related. Over time, however, it can be determined that, in fact, the disparate models are substantially related, and therefore it is desirable to utilize an output of one model as an input for a second model (e.g., data output from one data mining model can be utilized as input data and/or training data for a second data mining model). Utilizing conventional systems and/or methodologies, enabling an output of one data mining model to be employed as an input to a second data mining model requires significant custom programming as well as a substantial amount of time.

Another deficiency associated with data mining applications is that data mining models often need a significant amount of training data to operate properly. For instance, a new customer at a retail sales establishment will not be associated with data relating to such establishment. Therefore, data mining applications have difficulty in providing predictions or other relevant information to assist the customer or the retail establishment in recommending items. Therefore, developers of the data mining applications/models must write extensive code for special instances where no data is associated with a subject of a data mining model. An alternative conventional approach is to generate a static rule for all cases where insufficient training data exists—for instance, an individual may be utilizing a web-based retail establishment for a first time. Often, such establishments utilize virtual "shopping baskets" and recommend items to be placed within the basket by way of data mining model(s). A static rule can dictate that no recommendations are to be provided to customers who have not previously viewed and/or purchased items. Such rules, however, are inflexible despite user context and global statistics.

Moreover, in conventional data mining models/applications, users and/or developers are forced to specify a type of output. Particularly, for example, if it is desired that a time-series prediction be generated with respect to a data mining model, then a function specific to that prediction must be designated in order to obtain such prediction. Human error with respect to selecting a proper function can cause a user to be inconvenienced and/or a mining model to fail.

Conventional data mining models and/or applications are also quite expensive in terms of network usage as well as processing power usage with respect to clients utilizing a data mining application resident upon a server. For example, training a data mining model occurs on a server, where particular patterns are recognized. Predictions are generated by mapping input data with respect to existent recognized patterns, which are typically housed upon a server. Clients generally wish to review visualizations of patterns to determine results of the training. Conventionally, this visualization occurs by delivering an entirety of mining model content (e.g., pattern content) from the server to the client. The client can then analyze such content and generate a graphical display of results of the analysis. This retrieval and analysis of data is expensive, as client computers typically are not associated with processing power and memory of servers. Furthermore, networks can be subject to substantial traffic when a significant amount of data is retrieved from a server.

Accordingly, there exists a need in the art for systems and/or methodologies for improving usage and development of data mining models/applications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to novel systems/methodologies for receiving and implementing command(s) in a declarative language with respect to one or more data mining models. One or more novel aspects of the subject invention relate to more efficiently rendering various data mining operations when compared to conventional data mining systems/methodologies. In accordance with one aspect of the subject invention, command(s) in a declarative language can be received that relate to utilizing an output of a first data mining model as an input to a second data mining model subsequent to design of such models. Thus, if later desired, two models thought to be unrelated at a time of their design can effectively be communicatively coupled during utilization of such data mining models. The output of the first data mining model can be any suitable output; for example, the output can be a prediction, learned content (e.g., a pattern found within data), or the like. The second data mining model can thereafter employ such output as desired. For instance, it can be utilized as training input or as input utilized for generating a prediction. Furthermore, the subject invention can be applied to any suitable number of data mining models. For example, output of a first data mining model can be utilized as input to a second data mining model, output of the second data mining model can be utilized as input to a third data mining model, and so on, with any suitable number of data mining models included.

In accordance with another aspect of the subject invention, command(s) in a declarative language can be employed to cause a data mining model to output a prediction without requiring input data. In other words, the prediction can be generated solely as a function of training data and global statistics associated therewith. Conventionally, data mining models must receive some sort of input data in order to generate an output—however, such input data can either be unavailable and/or unnecessary. For example, in time-series analysis, input data is often not necessary when generating a prediction, yet is required when using a declarative language. Similarly, data mining models when first implemented are typically not associated with input data. Thus, conventionally, static results or additional code is required to generate an output to a user. Utilizing this aspect of the subject invention, statement(s) in a declarative language can cause a prediction to be output from a data mining model, wherein the data mining model solely utilizes training data and global statistics associated therewith.

In accordance with another aspect of the subject invention, a singular, general statement can be employed in a declarative language to cause a prediction of appropriate type to be output from a desired model. Thus, rather than utilizing individualized statement(s) for disparate model types, usability is improved by instead enabling a singular command to be employed. Data mining models that output the predictions can be analyzed. For instance, parameters associated with a data mining model, data types (e.g., discrete, continuous, . . . ) associated with a data mining models, and the like can indicate a type of prediction output by such data mining models. These parameters and data types can be analyzed, and an appropriate prediction type can be output as a function of the analysis.

A data mining object model is also contemplated and more fully described herein. The data mining object model provides a mechanism that enables developers to access content of data mining models upon a server and perform operations thereon (also upon the server). The operations can be stored upon the server and re-used when desired. Moreover, results of the operations can then be delivered to a client application. Thus, processing efficiency is improved and network bandwidth is saved by employing the data mining object model in connection with performing procedures and visualizing results thereof.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
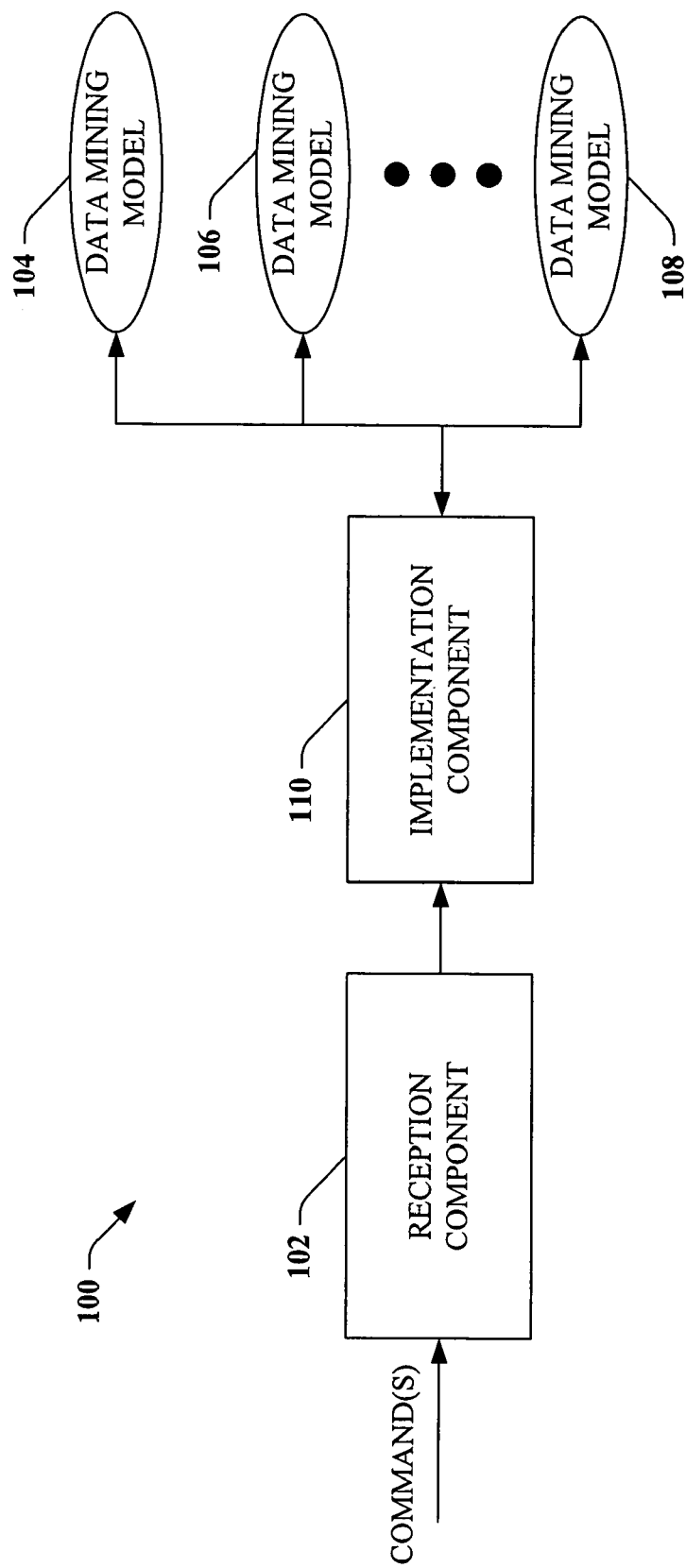
FIG. 1 is a high-level block diagram of a system that facilitates utilizing a declarative language to implement various novel command(s) in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one particular aspect of the subject invention. The subject invention relates to a novel system 100 that facilitates organization, manipulation, and training of one or more data mining models, and further facilitates obtaining predictive output from such data mining model(s). The system 100 includes a reception component 102 that receives commands relating to organization, manipulation, training, and/or predictive output of one or more data mining models 104-108. For example, the command(s) can relate to communicatively coupling together two or more of the data mining models 104-108 at a time subsequent to creation and implementation of such data mining models 104-108. Furthermore, these command(s) can be issued by way of a declarative language (e.g., a SQL-based language or other suitable declarative language). An implementation component 110 can receive the command(s) from the reception component 102 and facilitate carrying out of such commands. For instance, the implementation component 110 can modify the one or more data models 104-108 to enable utilization of output of one of such data models as input of another data model (for use in generating predictions and/or training purposes). When utilizing conventional systems/methodologies, it is extremely problematic to create such modifications (e.g., instructing an output of one data model to be utilized as an input to another data mining model) after design and implementation of such models. It is often the case, however, that an individual or entity utilizing the data mining models is unaware of any relation between data mining models prior to implementation thereof, yet relations may exist and/or it may be desirable to conjunctively utilize two data mining models. Thus, enabling routing of data between data models subsequent to their implementation is quite desirable.

The reception component 102 can further receive command(s) relating to obtaining predictions from one or more of the data mining models 104-108. The implementation component 110 can analyze the one or more data mining models 104-108 to determine a type of prediction to generate. In particular, the system 100 enables several prediction commands to be replaced by a singular command, wherein the implementation component 110 can analyze contents of the data mining model(s) 104-108 to determine a precise prediction type. For example, the implementation component 110 can analyze the data model 104 and determine that such data model 104 is utilized for time-series prediction purposes. The general command(s) received by the reception component 102 can then be automatically specified as a function of such analysis (e.g., a time-series prediction can be requested by the implementation component and generated by the data model 104). In another example, the data model 106 can be utilized to generate associative predictions (e.g., to determine a product type associated with a user). A general command (e.g., a "predict" command) can be received by the reception component 102 and delivered to the implementation component 110, which can thereafter analyze the data model 106 to determine that it is utilized for associative predictions. For instance, the implementation component can analyze column(s) associated with a prediction and/or the column's bound key types to determine a type of prediction desired. The implementation component 110 can then instruct the data model 106 accordingly, and such data model 106 can output a prediction as a function of the analysis undertaken by the implementation component 110. Data types within the data mining models 104-108 can be determined by way of reviewing a structure of the data mining models 104-108 and metadata associated therewith.

In accordance with yet another aspect of the subject invention, the system 100 can facilitate generating a prediction and/or training data output without data specific to a subject of the data mining models 104-108 being employed as input. Utilizing this aspect of the system 100, one or more of the data mining models 104-108 can be utilized to generate a prediction upon implementation of such model (e.g., upon training the data mining models 104-108). An example is provided herein to better illustrate this aspect of the subject invention. The data mining model 104 can be employed in connection with an Internet retail establishment, wherein such model 104 can be utilized to predict items that may be desirable to a customer. Problems can arise, however, if the customer has never visited the online retail establishment at a previous time (e.g., there is no input data relating to a subject of the data mining model 104). In conventional systems, specialized code must be written to account for such situations. For instance, special code can be written that informs the data model 104 to generate no predictions until adequate data is obtained for the subject. In another example, specialized code can be written to provide a static prediction (one that does not alter even if global statistics change). The subject invention enables the data model 104 to output dynamic predictions as a function of training data and/or global statistics.

In particular, the reception component 102 can receive command(s) indicating desirability of obtaining a prediction from one or more of the data models 104-108. The implementation component 110 can be delivered such command(s) or extensions thereof and cause such command(s) to be implemented on one or more intended data models 104-108. Specifically, the command(s) can originate from a user or computer entity and cause one or more of the data models 104-108 to output a prediction (e.g., a sequential prediction, a time-series prediction, an associative prediction, or the like). The data models 104-108 subject to the command(s) may have no input data associated therewith. Rather than initiating customized code for such situations, the data models 104-108 can output a prediction as a function of training data and/or global data accessible by the data models 104-108.

The system 100 of the subject invention can, in accordance with one particular aspect, operate in connection with a data mining object model (not shown) to facilitate viewing of content of one or more of the data mining models 104-108 as well as execution of procedures upon such content. For instance, the data mining model can facilitate structuring instances of data mining objects in a logical manner, thereby enabling a user to easily view such objects and decipher structure of content of the data mining models 104-108. In particular, instances of data mining objects can be generated and be accessible to a user or computer-related entity in a hierarchical manner, and such objects can be made available on a server. Conventionally, if content of a data mining model is desired for viewing and/or interpretation, large quantities of data must be delivered over a network to a client application, which then must interpret such data and visualize it in a desirable manner. The subject invention enables developers to create server-side code components utilizing any suitable programming language (e.g., NET). Moreover, developers can inspect content of one or more data mining model(s) 104-108 directly on a server (in server memory) without transporting such content. Upon inspection, the developers can perform any suitable processing (e.g., formatting, normalization, . . . ) and return to a client machine only data desirably displayed. For instance, the reception component 102 can receive commands to review and process content of one or more of the data mining model(s) 104-108 (which, for example, are resident upon a server). These command(s) can be relayed to the implementation component 110, which effectuates such commands through utilization of a data mining object model (not shown). Accordingly, a developer can access content of the data mining models 104-108 upon a server, create server-side components in any suitable programming language, select only useful content of the data mining models 104-108, execute desired processing on the selected content, and other suitable operations by way of the data mining object model.

Moreover, the system 100 can be employed to effectuate browsing and combining patterns within data mining models. Therefore, rather than forcing a client to obtain mining model content from two disparate mining models and then performing operations thereon, the subject invention provides mechanisms for performing such operations on a server and then returning only desirable results to a client. This is enabled by exposing a framework of the data mining object model as well as objects within the data mining models 104-108, as objects can then be manipulated and computations can be performed specific to an application (either on a server or a client). For instance, the reception component 102 can receive command(s) relating to reviewing, utilizing, and/or exposing framework of a data mining object model that can be implemented in connection with content within the data mining models 104-108. The implementation component 110 can then effectuate the aforementioned reviewing, utilizing, and/or exposing of the framework.

Figure 2:
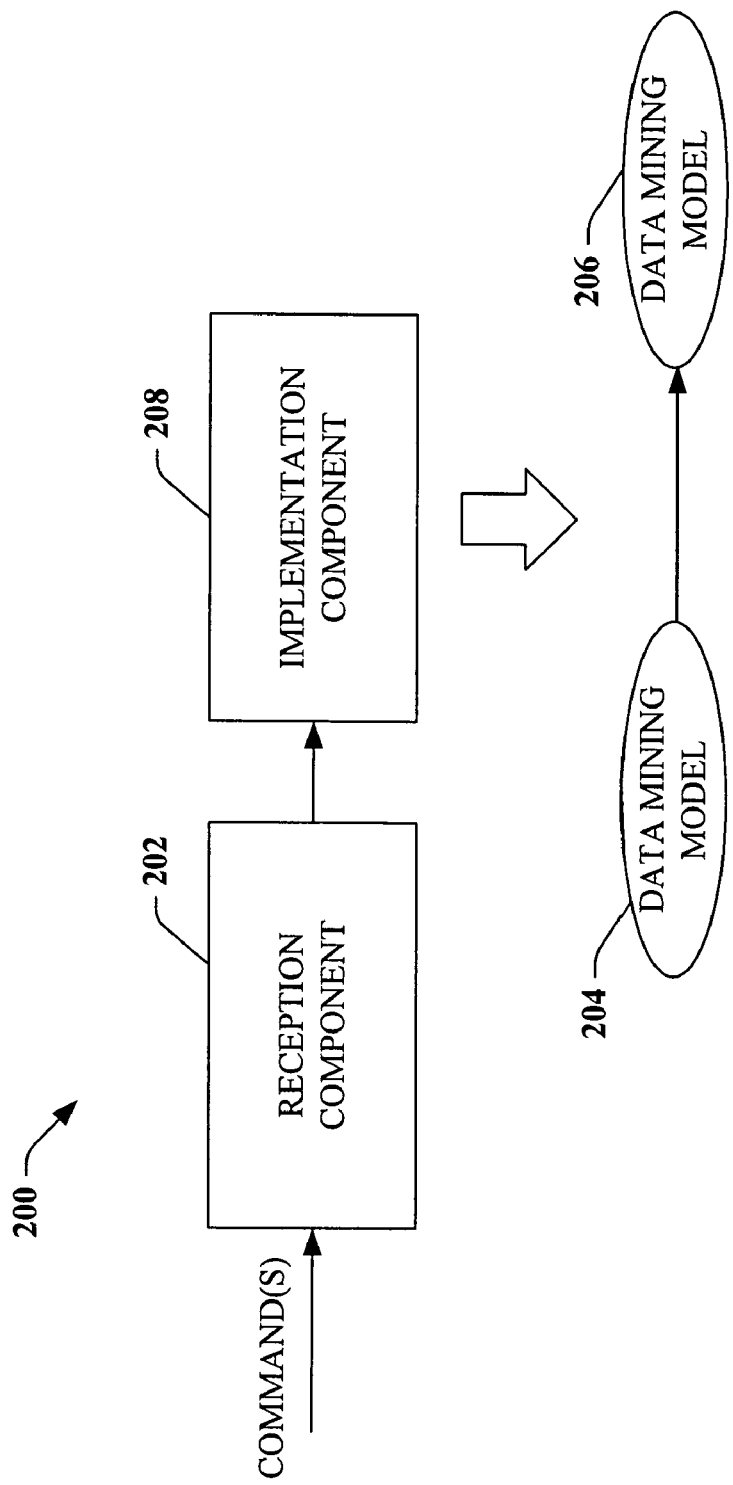
FIG. 2 is a block diagram of a system that facilitates utilizing a declarative language to cause an output of a first data mining model to be employed as an input of a second data mining model in accordance with an aspect of the subject invention.

Now referring to FIG. 2, a system 200 that facilitates communicatively coupling data mining models at a time subsequent to implementation thereof is illustrated. The system 200 includes a reception component 202 that receives commands relating to communicatively coupling together two disparate data mining models 204 and 206. In particular, the command(s) relate to utilizing output of the data mining model 204 as input to the data mining model 206. The command(s) can be received by an implementation component 208 by way of the reception component 202, wherein the implementation component 208 can cause the communicative coupling of the data mining model 204 and the data mining model 206. In accordance with one aspect of the subject invention, the command(s) can be declarative command(s) implemented within a declarative language. For instance, DMX (a data mining language) can include statements that enable the aforementioned communicative coupling. DMX is a data mining language which extends the Structured Query Language (SQL) in a natural, familial manner to handle data mining functionality. SQL is a declarative computer language for utilization with relational databases and/or quasi-relational databases.

In accordance with one exemplary aspect of the subject invention, extensions can be made to DMX to enable outputs of the model 204 to be utilized as training data for the model 206, as well as enable outputs of the model 204 to be utilized as input for a prediction generated by the model 206. DMX (as well as other declarative languages utilized in connection with data mining) includes defined statements for creating and training a model, as well as obtaining one or more predictions from a created model. For instance, the following example creates a mining model that can be employed to predict "CreditType" based upon occupation and income of one or more individuals by employing an algorithm entitled "Decision_Trees".

```
CREATE MINING MODEL myModel
(
    CustomerID      LONG        KEY
    Occupation      TEXT        DISCRETE
    Income          DOUBLE      CONTINUOUS
    CreditType      TEXT        DISCRETE PREDICT
) USING Decision_Trees
```

Additional statements produced below are utilized to train the created model (myModel) with data available in a table (in the below example, a "Customer" table).

INSERT INTO myModel (CustomerID, Occupation, Income, CreditType) SELECT* FROM Customer The above statements, however, only allow training data to be obtained by way of conventional SELECT and/or OPEN-ROWSET/SHAPE statements. Such statements do not enable the functionality of utilizing a prediction output from one model (e.g., data mining model 204) as training data input to another model (e.g., data mining model 206).

Similarly, as exemplified and described below, conventional statements do not enable utilizing a prediction output from the data mining model 204 as input for a disparate prediction to the data mining model 206.

SELECT myModel.CreditType, PredictProbability(myModel.CreditType) FROM myModel PREDICTION JOIN (SELECT 'Programmer' AS Occupation, 50000 AS Income)AS t ON t.Occupation=myModel.Occupation AND t.Income=myModel.Income The above SELECT statement is employed to obtain a prediction for "CreditType" for a particular customer whose occupation is 'Programmer' and income is 50000. This statement (as well as ordinary SELECT, OPENROWSET/SHAPE statements and other suitable statements), however, does not enable the prediction to be employed as input to a disparate model for a different prediction.

The subject invention generally, and the system 200 in particular, enables predictions output from the data mining model 204 to be utilized as training data input and/or input for another prediction into the data mining model 206. The following illustrates a general exemplary implementation of the subject invention into DMX.

INSERT INTO <model> (<mapped model columns>) <source data query>

In this example, <source data query> includes a prediction join query. A more detailed example is provided below.

INSTER INTO TreeModel (CustomerID, Occupation, Income, ClusterNo, CreditType) SELECT t.CustomerID, t.Occupation, t.Income, $Cluster
FROM myClusterModel NATURAL PREDICTION JOIN (SELECT*FROM Customer) AS t The above detailed example utilizes a PREDICTION JOIN query to deliver a "Customer" table into a clustering model (myClusterModel) and further retrieves a cluster number (ClusterNo) together with input columns related to the customer. The output of the PREDICTION JOIN query can then be employed to train a decision tree model (TreeModel). For instance, the data mining model 204 can be the model myClusterModel, and the data mining model 206 can be the model TreeModel. The above exemplary statements (commands) can be received by the reception component 202 and implemented by the implementation component 208 to communicatively couple the data mining models 204 and 206.

In another example, the system 200 can be employed to cause a prediction output by the data mining model 204 as input to the data mining model 206 to generate a disparate prediction. In one example, the following general statements can be employed in DMX to enable this coupling of the data mining models 204-206.

SELECT <select-list>
FROM <model> [NATURAL] PREDICTION JOIN <source data query> AS <alias>[ON <on_list>] [WHERE <where_clause>]

In this example, <source data query> includes a prediction join query. A more detailed example is provided below.

SELECT p.Income, TreeModel.CreditType
FROM TreeModel PREDICTION JOIN
(SELECT t.Occupation AS Occupation, t.Income AS Income, $Cluster AS ClusterNo
FROM myClusterModel NATURAL PREDICTION JOIN (SELECT*FROM Customer) AS t) AS p
ON p.Occupation=TreeModel.Occupation AND p.Income=TreeModel.Income AND
p.ClusterNo=TreeModel.ClusterNo In the above example, the PREDICTION JOIN query (inside the parenthesis) is first utilized to deliver a clustering model (myClusterModel) to a "Customer" table, and then obtains a cluster number together with input columns associated with the customer. The output of the PREDICTION join query is then delivered to a decisions tree model (TreeModel) to generate a prediction of CreditType. While the above examples illustrate usage with two disparate models, it is understood that any suitable number of models can be coupled in accordance with the subject invention. For instance, <source data query> can be an arbitrary nesting of PREDICTION JOIN statements.

The subject invention thus enables utilizing an output of the data mining model 204 as input for training and/or predictive purposes to the data mining model 206 subsequent to the design of the data mining models 204 and 206. Thus, two data mining models believed not to be related (or being associated with unknown relation) at design time can subsequently be utilized together for prediction/training purposes by way of a declarative language. For instance, a clustering model can be built and applied to a substantial portion of data (e.g., numerous customers of a retail establishment), wherein the clustering model can produce a plurality of different groups (clusters). It can be determined that there is some level of relation of data within a cluster, but it may be unknown how variables within each group are related. Thus, utilizing the subject invention, subsequent to the design of the cluster model, a distance tree can be employed, wherein output of the cluster model can be utilized as input to the distance tree.

In another exemplary implementation of the subject invention, the system 200 can be employed to determine whether a customer should be approved for a particular type of loan, wherein such determination is made as a function of customer transaction history. For instance, the data mining model 204 can be a clustering model that clusters disparate transactions undertaken by a user. The data mining model 206 receives information output by the clustering model and utilizes such information to predict whether the customer should be approved for the loan. In yet another exemplary implementation, the data mining model 204 can be utilized to divide a plurality of customers into clusters representing market segments. The output of the model 204 can then be utilized by the data mining model 206 to predict customers in market segments that are likely to purchase one or more goods.

While the above examples utilize clusters/predictions as outputs of one data mining model and inputs of another data mining model, it is understood that any suitable outputs are contemplated by the inventors of the subject invention and intended to fall under the scope of the hereto-appended claims. For instance, learned content can be output by the data mining model 204 and utilized as input by the data mining model 206, and a declarative language can be employed to generate such connection. Therefore, the data mining model 206 can perform data mining on patterns learned by the data mining model 204. In yet another example, the data mining model(s) 204 and 206 can utilize machine-learning techniques while performing predictions to continuously improve predictions output therefrom. Thus, a chain of models can consist of such algorithms, thereby producing continuously improving predictions. From these examples it can be determined that any suitable interconnection of data mining models can be accomplished in accordance with the subject invention.

Figure 3:
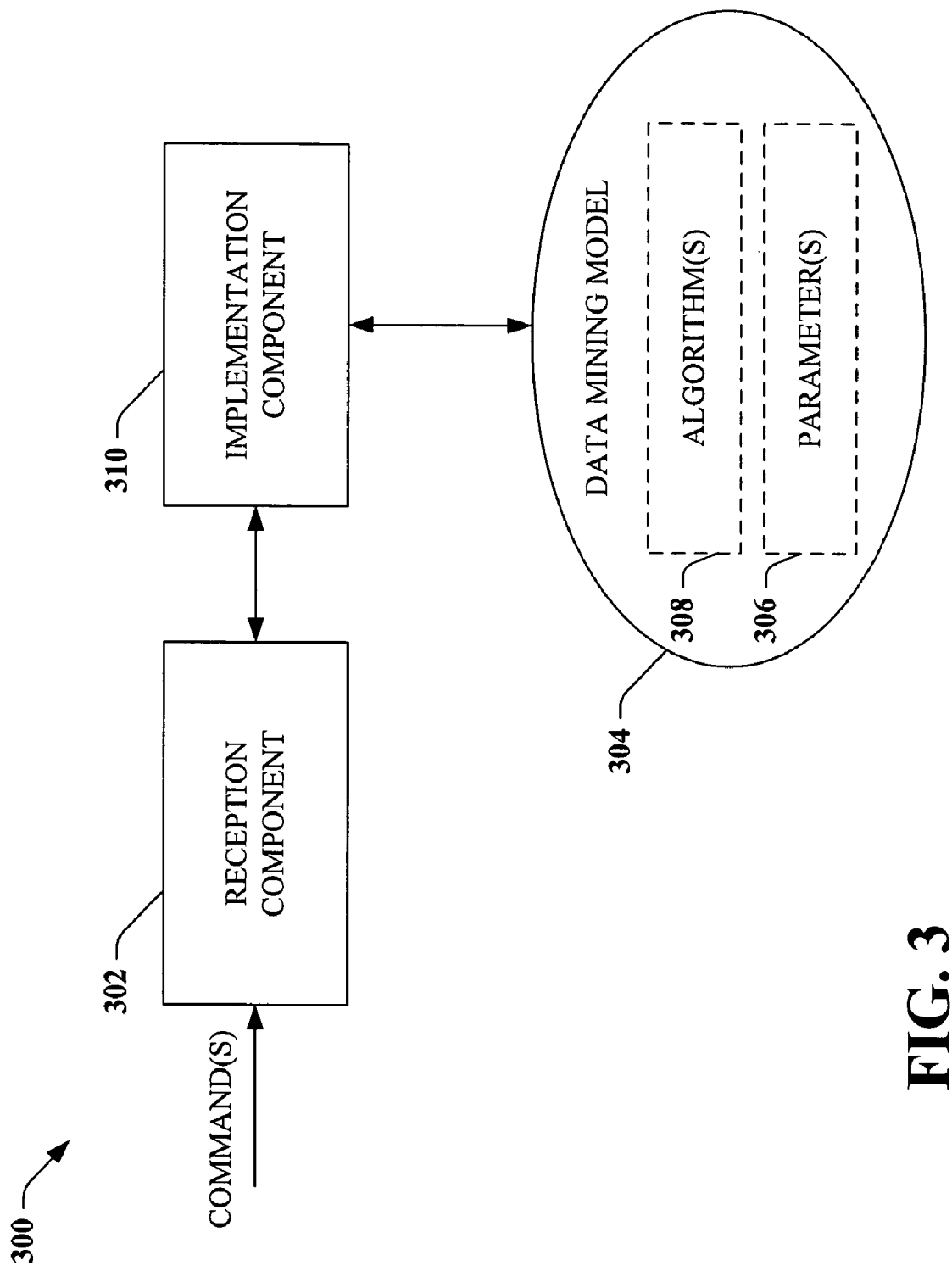
FIG. 3 is a block diagram of a system that utilizes a singular, general predictive statement in a declarative language to yield output of a prediction of an appropriate type in accordance with an aspect of the subject invention.

Now referring to FIG. 3, a system 300 that facilitates obtaining predictions from one or more data mining models is illustrated by utilizing a singular "predict" statement in contrast to specified statements that depend upon a type of prediction desired. The system 300 includes a reception component 302 that receives command(s) relating to obtaining a prediction from a data mining model 304. In accordance with one aspect of the subject invention, the command(s) can be received in a declarative language utilized in connection with data mining, such as DMX. Other suitable declarative languages, however, are contemplated by the inventors of the subject invention. The command(s) can utilize a singular statement regardless of type of prediction desired. For instance, conventional systems/methods for obtaining a prediction typically utilize disparate predict statements for different prediction types. In a specific example, DMX includes commands for predicting with respect to sequence data (PredictSequence), predicting with respect to time-series data (PredictTimeSeries), and predicting with respect to associative membership data (PredictAssociation). This individualized approach is associated with unnecessary complexity in declarative languages and renders usability more difficult.

Within the data mining model 304 exists one or more parameter(s) 306 as well as one or more algorithms 308 utilized to generate predictions. An implementation component 310 receives the command(s) from the reception component 302 and analyzes the parameters 306 and the algorithms 308, which can include data indicative of a type of prediction desired. For instance, if data analyzed by the data mining model 304 is in the form of a discrete scalar, a classification type-prediction is desired. In another example, if upon analysis undertaken by the implementation component 310 a nested table with sequential data related to the data mining model 304 is located, a sequence prediction is desired. A table is provided below that maps parameter and model indicia with a predictive task, wherein such table can be utilized in connection with DMX.

| PARAMETER AND MODEL | PREDICTIVE TASK |
| --- | --- |
| Discrete scalar | Classification |
| Continuous scalar | Regression (prediction) |
| Nested table with KEY | Associative prediction |
| Nested table with KEY TIME | Time series prediction |
| Nested table with KEY SEQUENCE | Sequence prediction |

The system 300, then, can utilize the above table (or other suitable tables for disparate declarative languages) to map a singular, less complex command to produce a desirable prediction from the data mining model 304. For example, a command and/or statement of "Predict" can be received by the reception component 302 and provided to the implementation component 310. The implementation component 310 can then analyze the parameters 306 and algorithms 308 to determine a type of prediction desired. Thereafter, the "Predict" statement can be associated with appropriate functionality to enable generation of a desired prediction type.

Figure 4:
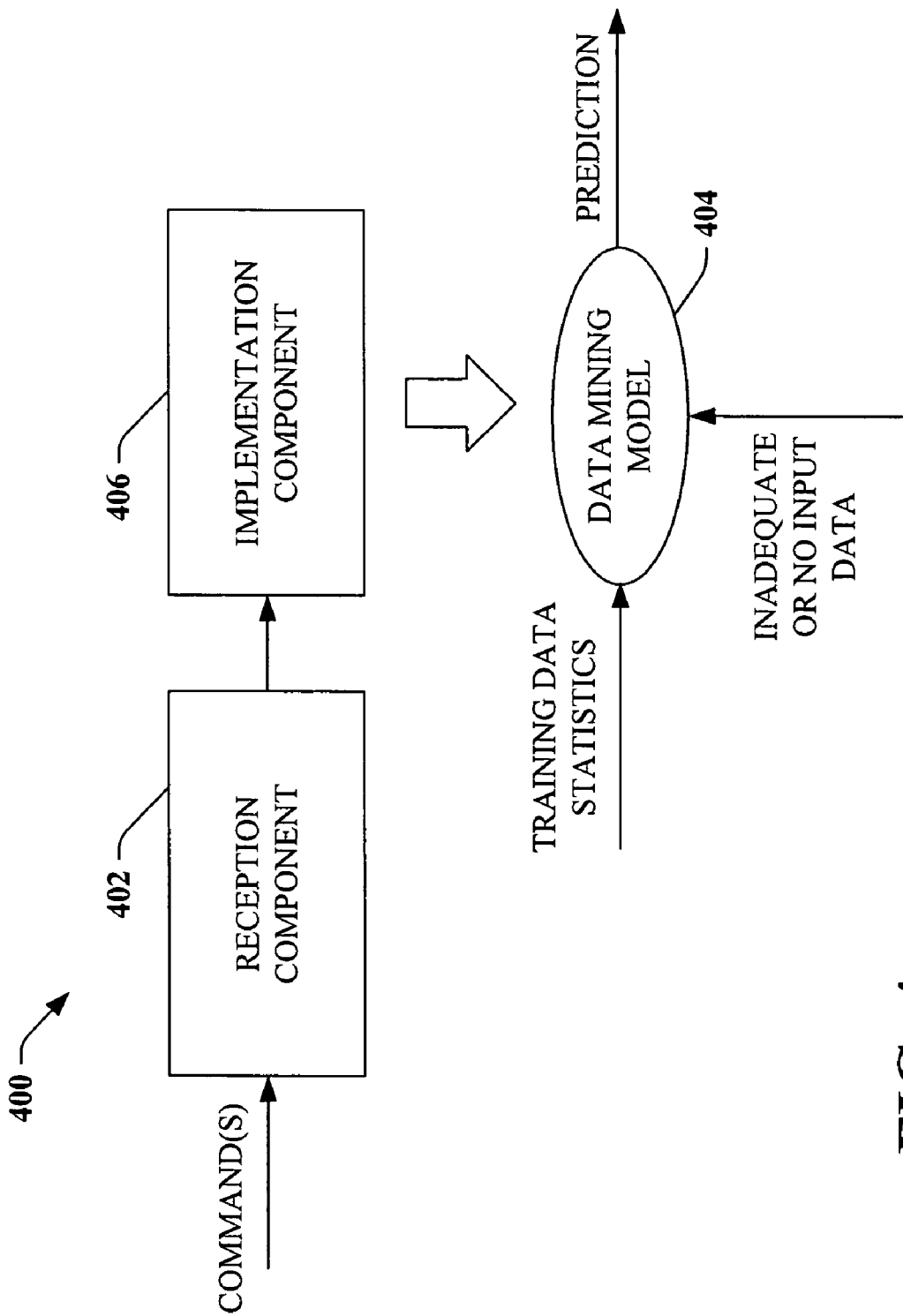
FIG. 4 is a block diagram of a system that facilitates utilizing statement(s) in a declarative language to cause a data mining model to output a prediction without input data in accordance with an aspect of the subject invention.

Now turning to FIG. 4, a system 400 that enables generation of a dynamic prediction without adequate input data is illustrated. The system 400 includes a reception component 402 that receives command(s) written in a declarative language that are instructive as to generating a prediction from a data mining model 404, wherein the prediction is based upon training data and global statistics obtained therefrom. The data mining model 404 has access to training data and/or global statistics that can be utilized in connection with generating a prediction. The data mining model 404, however, is associated with inadequate input data or it is undesirable to obtain a prediction based upon input data. For instance, the model 404 may be employed to predict items a customer is most likely to purchase. The customer, however, may not be associated with sufficient input data to generate a prediction (e.g., the customer may have never purchased any items). Conventionally, specialized code is written for such circumstances. For instance, code can be written that informs the data mining model 404 to generate no predictions until sufficient input data is obtained. In another example, code can be written that provides for a static output. For instance, until adequate input data is obtained, conventionally the data mining model 404 can be instructed to predict an item or set of items without deviation therefrom.

The declarative command(s) are received by the reception component 402 and then provided to an implementation component 406, which causes the data mining model 404 to output a prediction utilizing training data and global statistics associated therewith. Such a prediction is often useful when a user desires to obtain statistics for an entire population or with respect to time-series analysis where future prediction is a function of historical data within training data. Such functionality is not available in conventional declarative languages.

As an example, DMX currently includes a defined SELECT statement that is utilized for obtaining a prediction, wherein DMX is associated with the following syntax:

SELECT <select-list>
FROM <model> [NATURAL] PREDICTION JOIN <source data query> AS <alias>[ON <on_list]
[WHERE <where_clause>]

The above statements operate to deliver input data specified in <source data query> to a model (<model>) with column bindings specified in <on_list>. The statements further enable retrieval of predictions from the model as specified in <select-list>. For a more specific example, suppose it is desirable to predict "CreditType" of a new customer.

SELECT Predict(myModel.CreditType), PredictProbability (myModel.CreditType)
FROM myModel PREDICTION JOIN (SELECT 'Progammer AS Occupation, 5000 AS Income) AS t
ON t.Occupation=myModel.Occupation AND t.Income=myModel.Income These statements provide a prediction for a most probable "CreditType" as well as its probability for a customer whose occupation is that of a "Programmer" and income is 50000. These statements require input data to generate a desirable prediction.

The subject invention in general, and the system 400 in particular, enables statements in a declarative language to be received and effectuated that causes a data mining model to perform a prediction only given training data and global statistics relating thereto. An exemplary general declarative statement in DMX that enables the generation of a "content-only" prediction is provided below.

SELECT <select-list>
FROM <model>
[WHERE <where_clause>]

A more specific example is provided herein that can be utilized to determine a most probable CreditType as well as a probability associated therewith (without having to specify a particular user or other user input).

SELECT Predict(myModel.CreditType), PredictProbability
   (myModel.CreditType)
FROM myModel An example of utilizing this aspect of the subject invention relating to time-series analysis is provided below, where, for instance, a five-day forecast relating to stock quotes is created as a function of historical data (e.g., training data).
SELECT Predict(myStockModel, 5)
FROM myStockModel From the above examples it is readily ascertainable that such functionality is desirable in data mining contexts. For instance, in time-series analysis, it is often unnecessary to deliver input data to a mining model in order to determine a desirable prediction. Thus, the system 400 makes up for such deficiency by enabling reception (by way of the reception component 402) and implementation (by way of the implementation component 406) of declarative statements informing a data mining model 404 to generate a prediction based solely upon training data and/or global statistics associated therewith.

Figure 5:
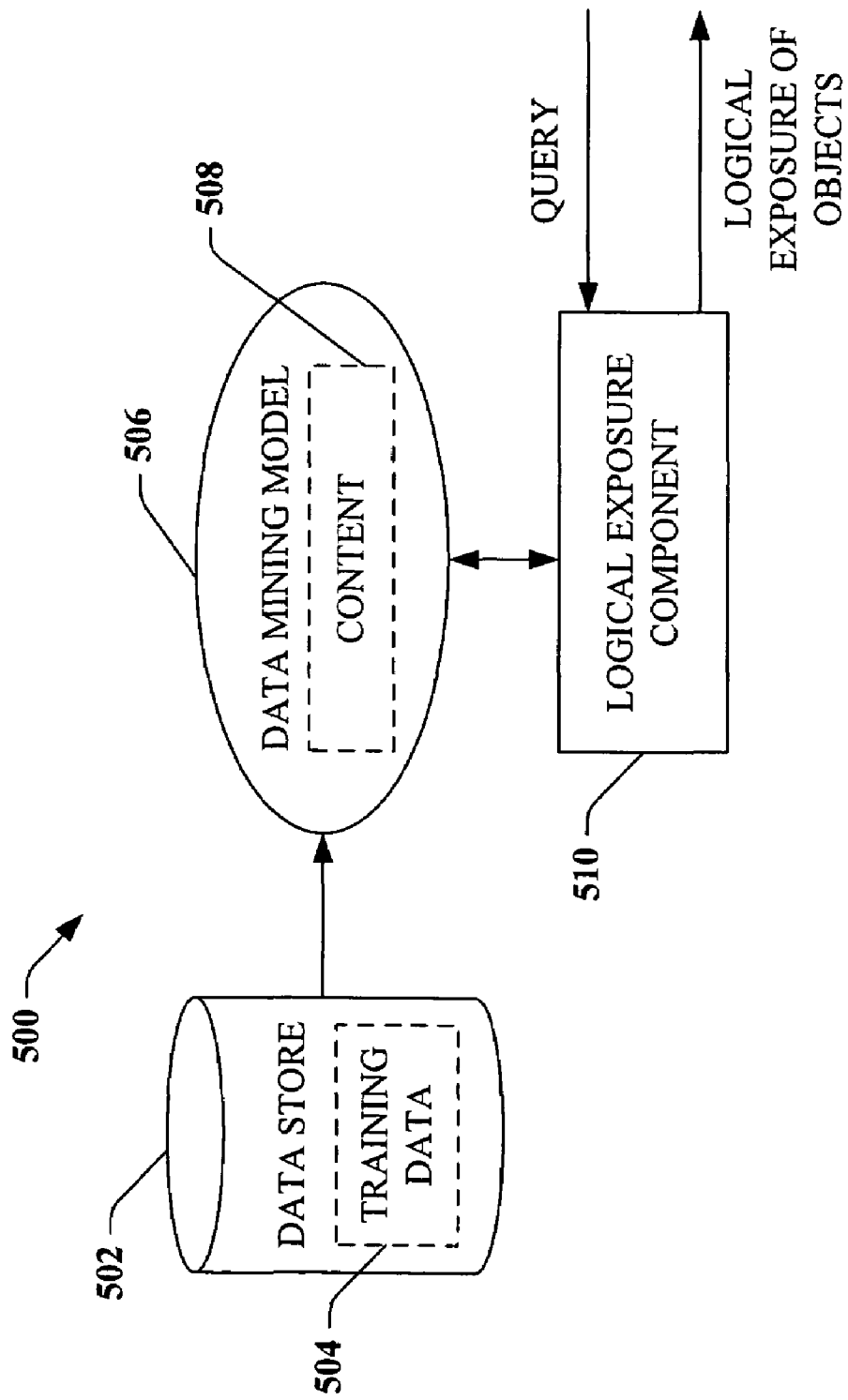
FIG. 5 is a block diagram of a system that facilitates generating a logical representation of a data mining model as a group of object instances by way of a data mining object model in accordance with an aspect of the subject invention.

Now referring to FIG. 5, a system 500 that utilizes a data mining object model to facilitate representing content of a data mining model for processing and representation is illustrated. The system 500 includes a data store 502 that retains training data 504. A data mining model 506 contemplates this training data 504 and recognizes patterns within the training data 504. These patterns are persisted as content 508 of the data mining model 506, and can be utilized for display purposes and applied to additional data to obtain knowledge relating to such data.

Figure 13:
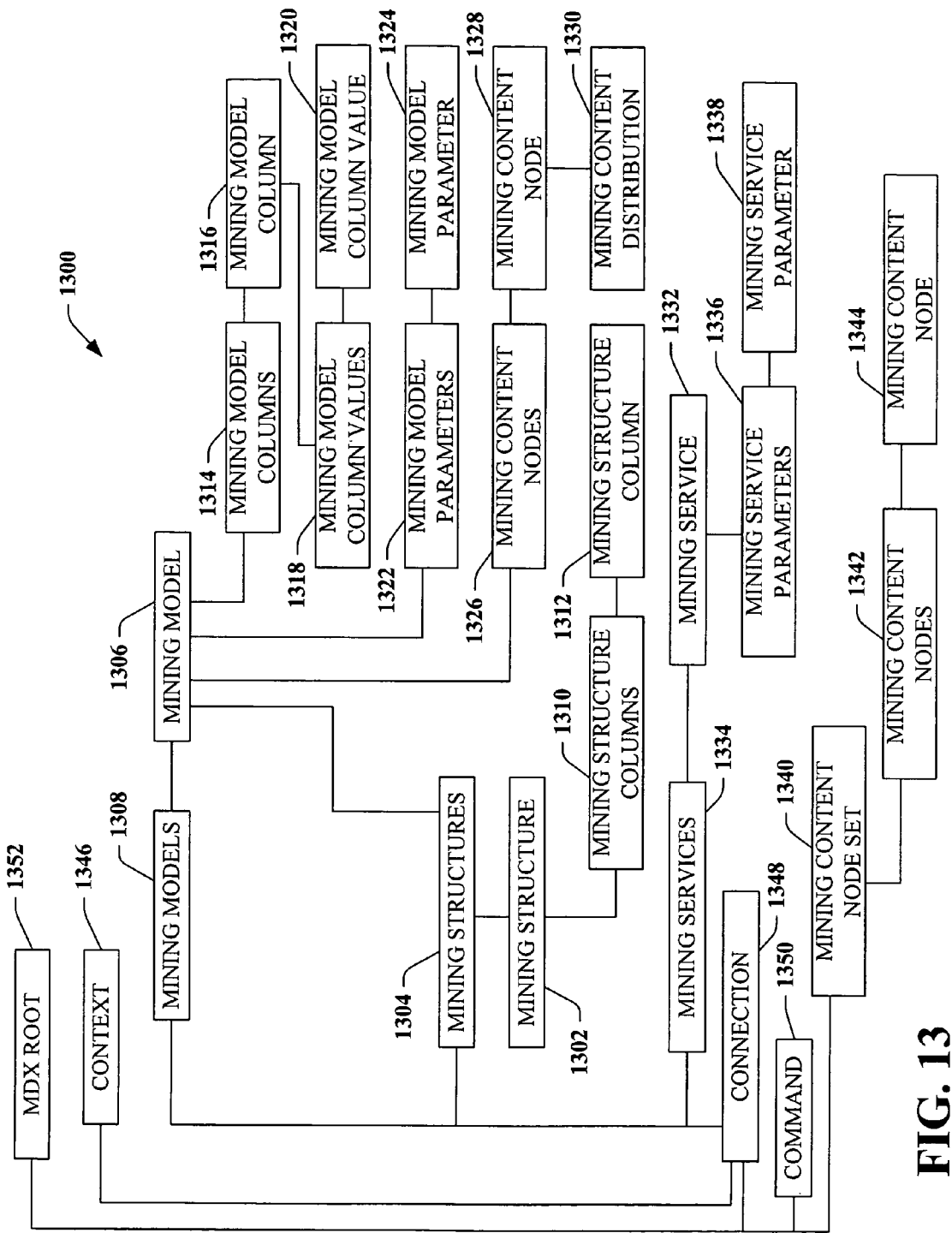
FIG. 13 is an exemplary data mining object model that can be employed in connection with one or more aspects of the subject invention.

The system 500 further includes a logical exposure component 510 that receives queries in a data mining language. For instance, the language can be a declarative language (e.g., SQL, MDX, a derivative thereof, or any other suitable data mining language). The queries retrieve desirable content from the data mining model 506, and the logical exposure component 510 exposes results of the queries in a logical manner to the client. For instance, objects or instances thereof can be represented to a client and/or a client application in a hierarchical manner. Moreover, a structural description of the training data 504 (e.g., metadata) can be logically exposed to a client as objects or instances thereof by way of the logical exposure component 510. The data mining object model of the subject invention provides a logical mechanism for querying, displaying, and processing the content 508 of the data mining model 506. For instance, the data mining object model can define a hierarchy of objects and parameters associated therewith to facilitate a logical arrangement of content 508 of the data mining model 506. An exemplary data mining model that can be employed by the logical exposure component 510 is illustrated in FIG. 13 and described herein.

Figure 6:
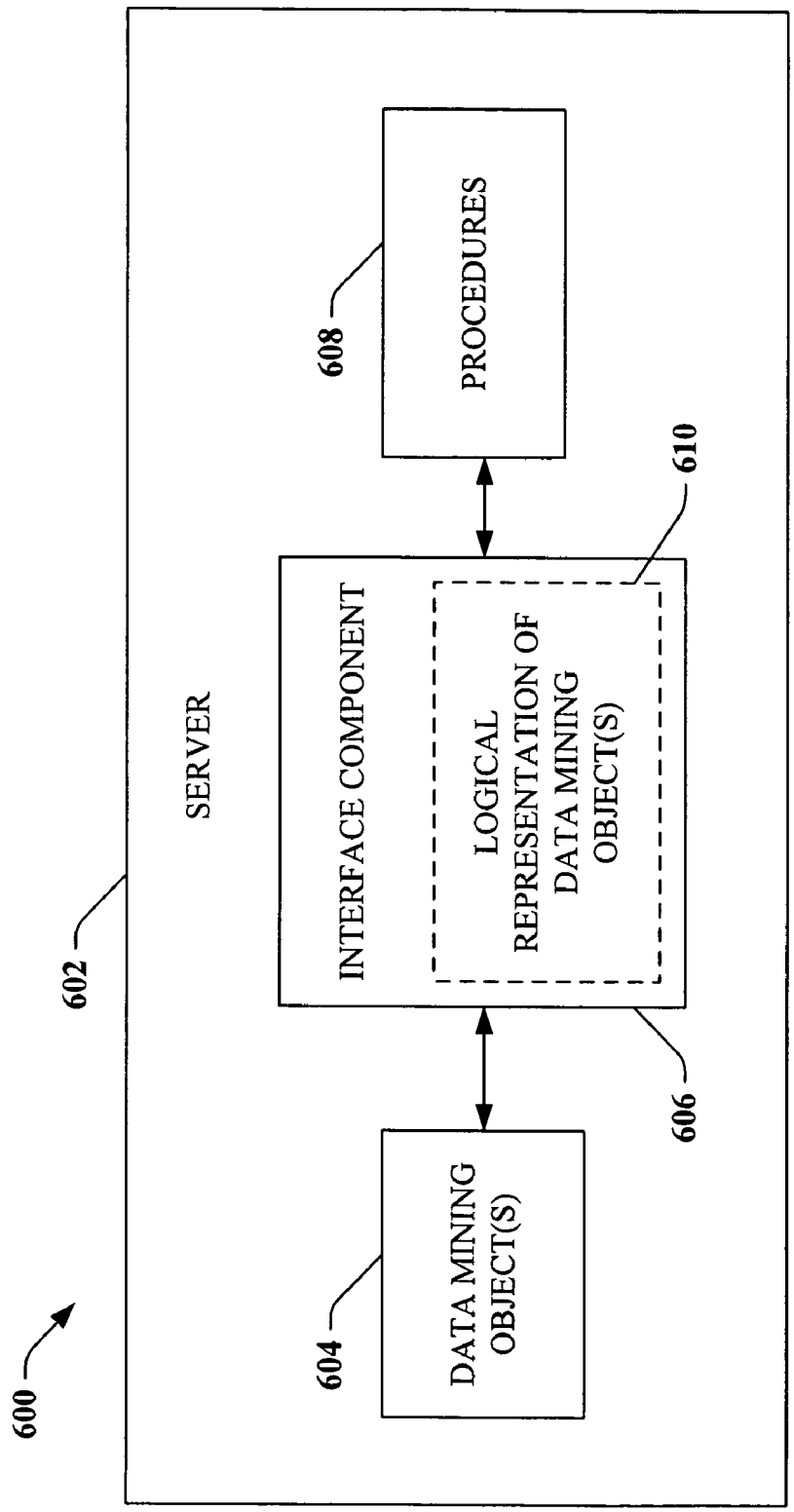
FIG. 6 is a block diagram of a system that facilitates utilizing stored procedures against content of a data mining model by way of a data mining object model in accordance with an aspect of the subject invention.

Turning now to FIG. 6, a system 600 existent upon a server 602 that utilizes a data mining object model to enable utilization of procedures on the server 602 is illustrated. The server 602 can be any suitable server or combination of servers that houses a data mining model (not shown) and data mining objects 604 associated therewith. The data mining objects 604 can be associated with patterns learned by a data mining model with respect to data contemplated by such model. The server 602 further includes an interface component 606 that enables such data mining objects 604 to be accessed and operated on by way of stored procedures 608 existent upon the server 602. The procedures 608 can relate to formatting, normalization, or any other suitable procedure that can be undertaken by the stored procedures 608. As the procedures 608 are stored upon the server 602, they can be re-used at a later instance without causing additional network traffic.

The interface component 606 can include a set of objects that are included within a data mining object model, which can be implemented as a Common Languages Runtime (CLR)—compatible class library. For instance, the interface component 606 can facilitate loading the class library into memory of the server 602 and couple such library with the infrastructure of the server 602. The class library of the interface component 606 enables the data mining objects 604 to be accessed according to rules and structure of the data mining object model. Thus, the interface component can essentially provide the stored procedures 608 with a logical representation of data mining objects 610.

In accordance with one aspect of the subject invention, the stored procedures 608 can expose public methods that can be directly invoked by remote clients by way of a data mining query language. Therefore, the procedures 608 can perform complex and elaborate operations over content of a data mining model (not shown) as well as metadata associated with the data mining objects 604. Then, utilizing a suitable programming language, essential results obtained from the complex operations can be returned to a client (without requiring an entirety of content of a data mining model to be delivered to the client). Thus, bandwidth of a remote client is not utilized by delivering extraneous information. Further, a majority of servers are more powerful machines than remote clients—therefore, operations can be completed in a more expedient manner on a server than when compared with a client.

In another exemplary implementation of the system 600, the server 602 (or system of servers) can be partitioned into various portions (or servers); a first portion that is utilized solely for data mining applications and a disparate portion (e.g., the interface component 606) that provides instances of objects on the first portion to various procedures. The stored procedures 608 can utilize the data mining object model to browse contents (e.g., patterns, knowledge, . . . ) and metadata relating to the objects 604 upon the server 602.

Figure 7:
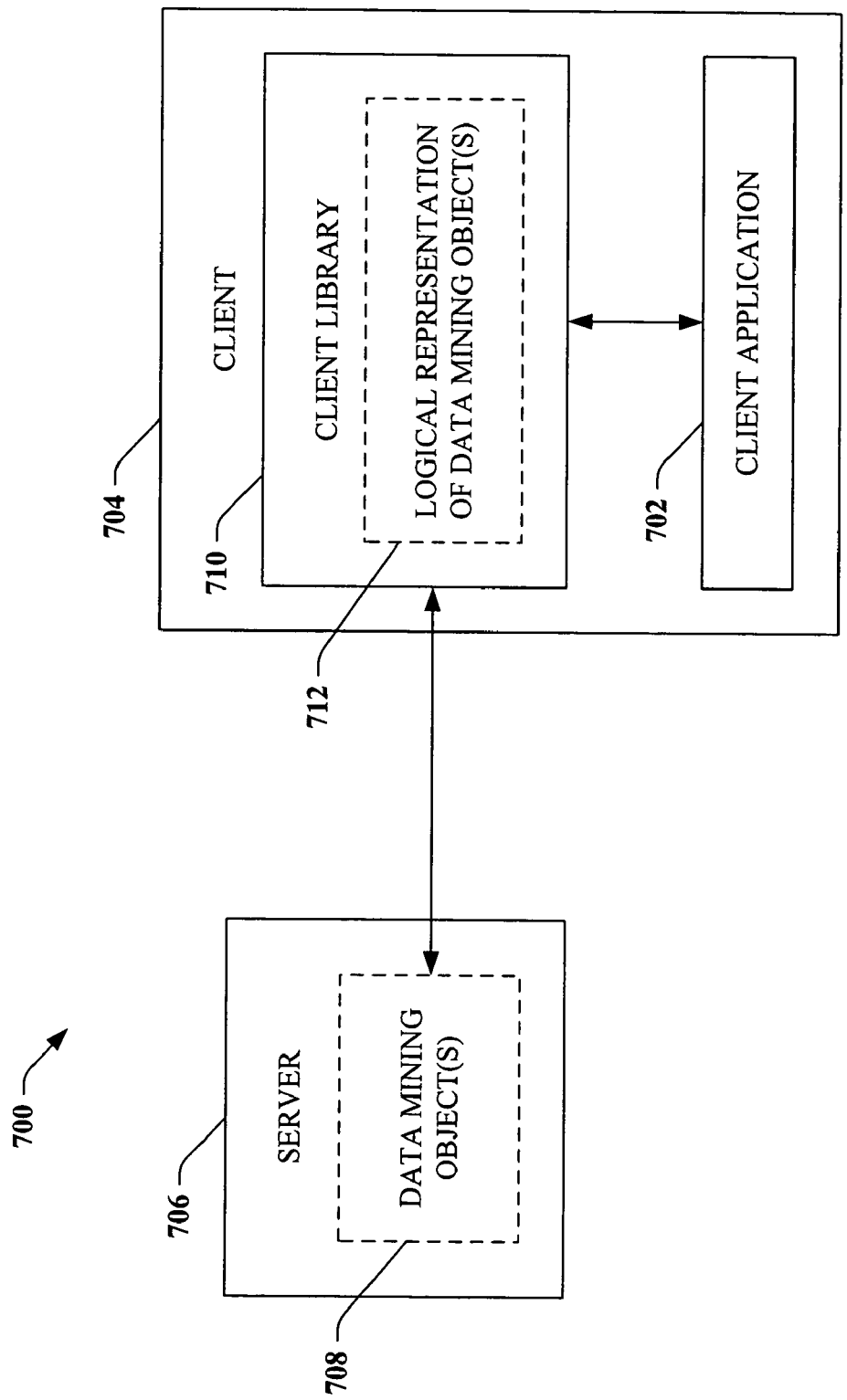
FIG. 7 is a block diagram of a system that facilitates visualizing learned content of a data mining model upon a client by way of a data mining object model in accordance with an aspect of the subject invention.

Now referring to FIG. 7, a system 700 that utilizes a data mining object model with respect to client-side applications is illustrated. Use of a data mining object model provides application developers with a mechanism for logically browsing content (e.g., determined patterns) within a data mining model. Moreover, this logical browsing by way of a data mining object model provides developers with an ability to execute complex operations over patterns of a data mining model and extract information from such content. In contrast, in conventional systems, a developer must have a priori knowledge of a layout of patterns and information therein that is exposed by various algorithms in order to create a visual representation of desired model content (knowledge). In particular, during training of a data mining model, algorithms utilized by such model discover patterns (e.g., knowledge) within data considered by the algorithms and data mining model. These located patterns (or knowledge of such patterns) is persisted as content of the data mining model. Typically, these models are held upon a server, and clients utilize content of the models by displaying the determined patterns and/or applying the patterns to a disparate set of data to obtain information relating to this data.

The system 700, in accordance with one exemplary aspect of the subject invention, can be utilized in connection with a client application 702 existent upon a remote client 704. The system 700 includes a server 706 that retains data mining objects 708 associated with a data mining model (not shown). Algorithms (not shown) utilized by the data mining model are employed to discover patterns within data, and the data mining objects 708 are representative of knowledge of such patterns. The data mining objects 708 can, for example, be associated with a security component (not shown) that analyzes usernames, passwords, biometric indicia, or the like to determine whether and to which objects (or instances thereof) a user is authorized to access. In another example, one or more of the data mining objects 708 can be associated with various levels of protection. For instance, object instances can be labeled as read-only, read-write, or non-accessible. These levels of access can vary with a user, a machine, or any other suitable indicia.

The system 700 thus provides the client application 702 with access to metadata and content information in a logical manner (in contrast to metadata and content returned in a tabular format conventionally provided to a client application). The system 700 can, in one exemplary implementation, operate in conjunction with a data mining object model (described more fully herein) in the following manner. A client library 710 (e.g., an ADOMD.Net client library) can employ discovery statements to obtain information relating to content of the data mining model (e.g., the data mining objects 708). The data mining model (resident upon a server) reflects such objects 708 inside the server 706 as a function of results of the discovery statements in order to generate a logical representation of the objects 712 that are inside the server. In particular, the client library 710 can provide instances of the objects 708 that relate to the data mining object model. The client application 702 utilizes the client library 710 to browse the content of the data mining model (e.g., the data mining objects 708) in a logical manner.

Referring to FIGS. 8-11, various methodologies in accordance with various aspects of the subject invention are illustrated. While, for purposes of simplicity of explanation, the methodologies are shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 8:
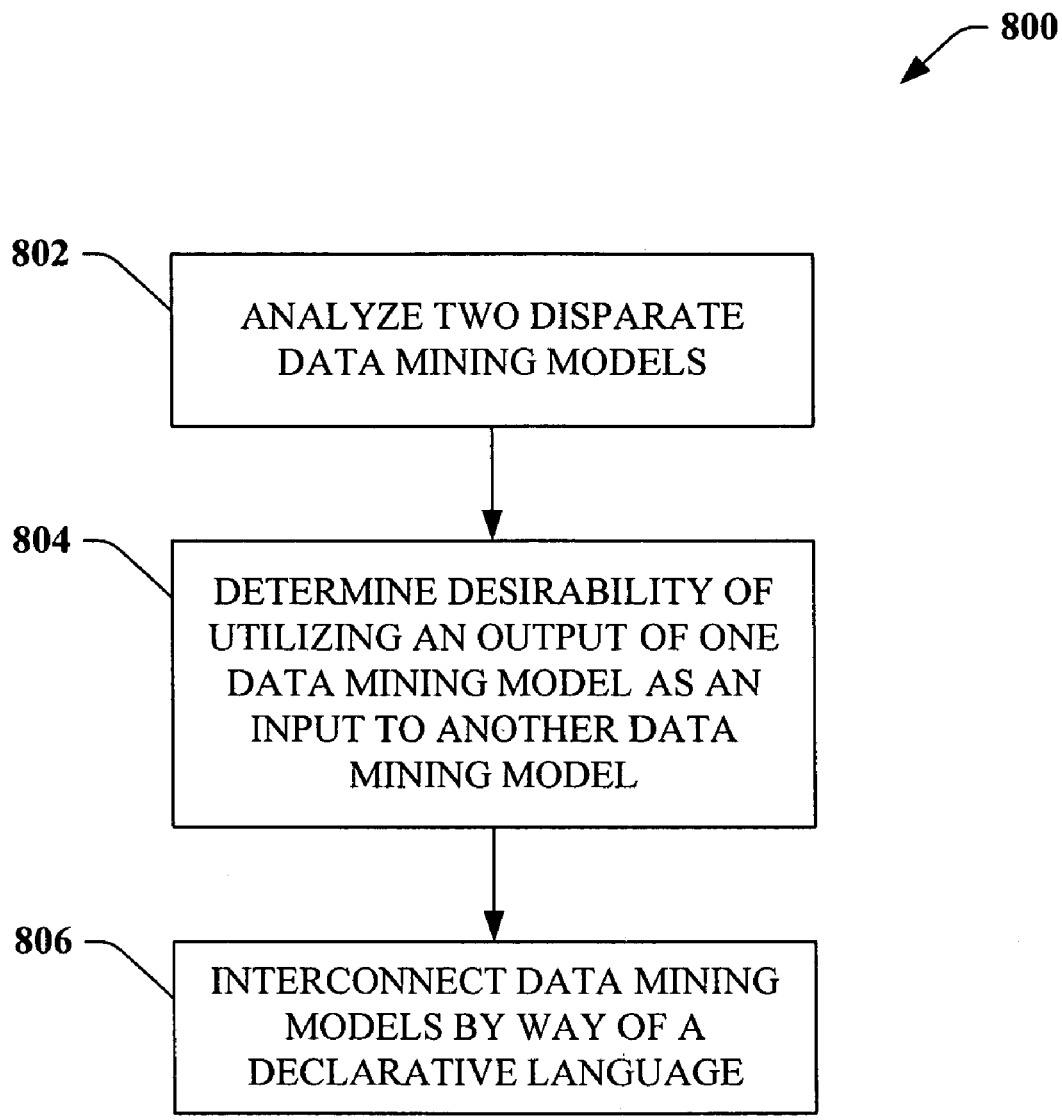
FIG. 8 is a flow diagram illustrating a methodology for utilizing an output of a first data mining model as an input for a second data mining model in accordance with an aspect of the subject invention.

Turning now specifically to FIG. 8, a methodology 800 that facilitates communicatively coupling disparate data mining models subsequent to design thereof is illustrated. In particular, the methodology 800 enables a developer to employ a declarative language (e.g., SQL, DMX, or the like) to cause an output of a first data mining model to be employed as an input to a second data mining model. Moreover, a series of data mining models can be interconnected. For instance, an output of a first data mining model can be utilized as an input to a second data mining model, an output of the second data mining model can be utilized as input to a third data mining model, and so on. Similarly, an output of a first data mining model can simultaneously be employed as an input to a second and third data mining model, and outputs therefrom can be employed as inputs to one or more disparate data mining models. Thus, the methodology 800 is intended to cover all suitable chainings of data mining models.

At 802, at least two disparate data mining models are analyzed to determine the relation therebetween. The analyzed data mining models can be clustering models, models utilized for predictions, models employed to determine patterns, or any other suitable data mining model and utilization thereof. Moreover, the data mining models are analyzed subsequent to their design and implementation. Thus, the data mining models do not have to be designed to deliver data therebetween—rather, such interconnection of the data mining models can occur during use of the models.

At 804, desirability of utilizing an output of one data mining model as an input to a disparate data mining model is determined. For instance, one model can be a clustering model that clusters groups of individuals or entities, and a disparate model may be a prediction model that generates predictions relating to individuals or entities. Accordingly, it may be desirable to cluster individuals and then generate predictions upon a cluster rather than outputting a prediction relating to a larger population. Thus, it may be desirable to perform a more granular prediction (e.g., to perform a prediction upon a cluster rather than perform it upon an entire population of data). In another example, a first model can be utilized to determine patterns in data, and a second model can be employed to analyze patterns and make predictions as a function of the patterns, although the two models, at a time of design, were believed to be not sufficiently related. At a later instance, however, it is found that the second data mining model can operate on patterns discovered by the first data mining model. Thus, it can be determined that communicatively coupling the two data mining models is desirable.

At 806, two or more desirably coupled models are interconnected by way of a declarative language. Thus, output from one data mining model can be utilized as input to a disparate data mining model during utilization of such models, and these models do not have to be designed in a manner to require such coupling. Moreover, numerous models can be linked together to create a chain of linked data mining models of a size desired by a user of the data mining models.

Figure 9:
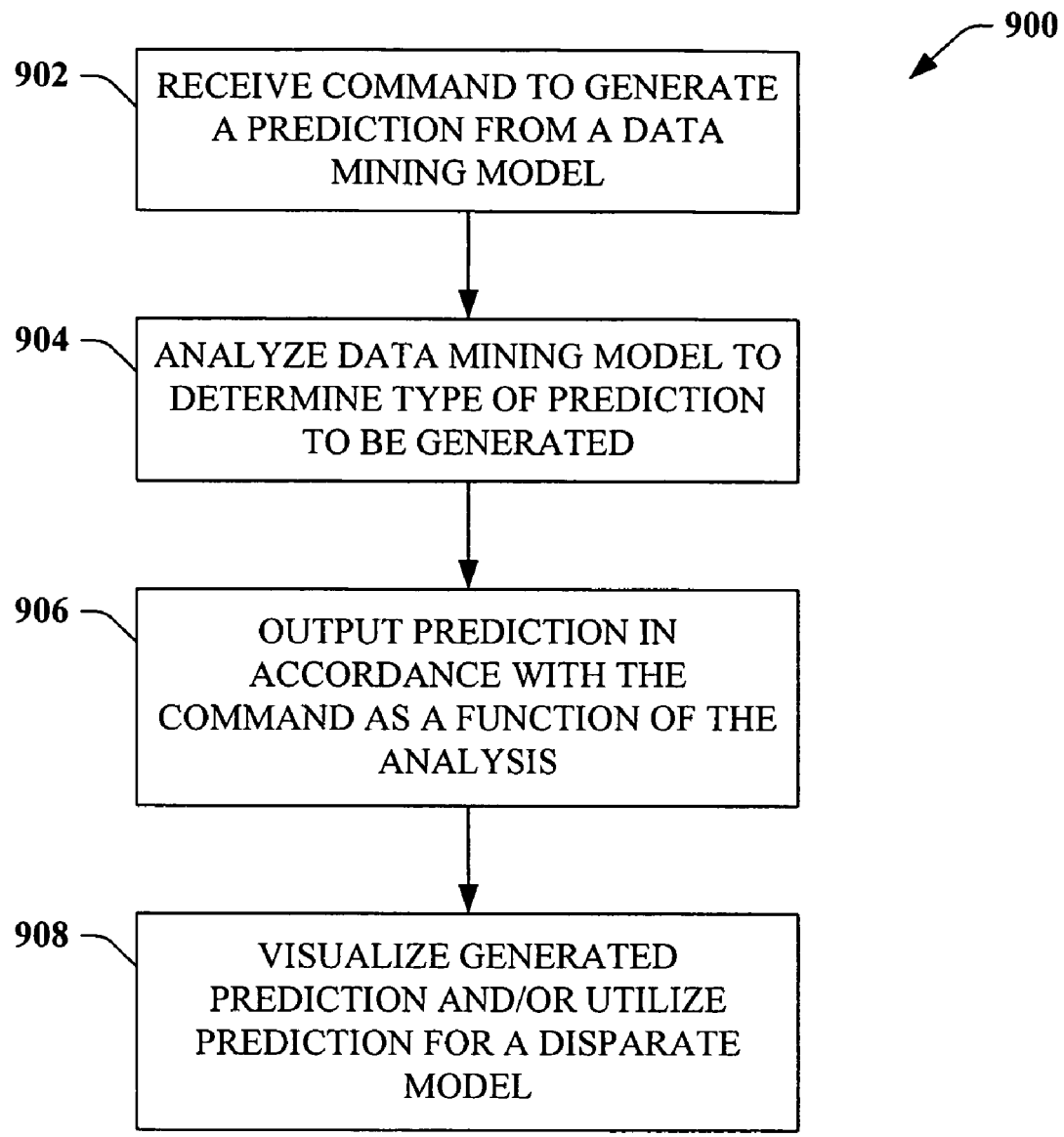
FIG. 9 is a flow diagram illustrating a methodology for generating a prediction of an appropriate type by way of a singular, general predictive statement in a declarative language in accordance with an aspect of the subject invention.

Referring now to FIG. 9, a methodology 900 for automatically selecting a type of prediction operation to implement upon receipt of a general command relating to prediction is illustrated. At 902, a general command that causes a data mining model to output a prediction is provided. For instance, conventionally, several disparate types of prediction commands are employed to cause generation of different prediction outputs. For example, a first command can be utilized to cause a data mining model to output a prediction relating to time-series analysis, a second command can be utilized to cause a data mining model to output a prediction relating to a sequence, a third command can be employed to cause a data mining model to output a prediction relating to an association, etc. In the methodology 900, however, a singular, general command can be utilized regardless of a type of prediction desirably output.

At 904, a data mining model that the command is directed towards is analyzed to determine an appropriate prediction. For instance, a data mining model utilized to generate a time-series prediction would be associated with continuous data. Thus, upon analyzing data associated with the data mining model, it can be determined that such data is continuous, thus providing an indication that a time-series prediction is desired. Other parameters relating to the data mining model can also be analyzed and provide indicia as to a type of prediction desired.

At 906, a prediction can be output in accordance with the analysis of the data model. For instance, if, upon analysis, a data mining model is determined to be associated with a sequential prediction, then a sequential prediction will be automatically output. Thus, a prediction command specific to a sequential prediction output is not required in accordance with an aspect of the subject invention. Similarly, associative predictions, time-series predictions, regression predictions, and other suitable predictions can be generated as a function of the analysis, where parameters and data are analyzed to determine a prediction type typically associated with data mining models. At 908, the output predictions can be presented to a user. For instance, the prediction can be presented by way of a printed output, visualized on a graphical user interface, audibly output by way of a speaker, or any other suitable manner of output. In accordance with a disparate aspect of the subject invention, the prediction output can be utilized as input to a disparate data mining model for training and/or predictive purposes.

Figure 10:
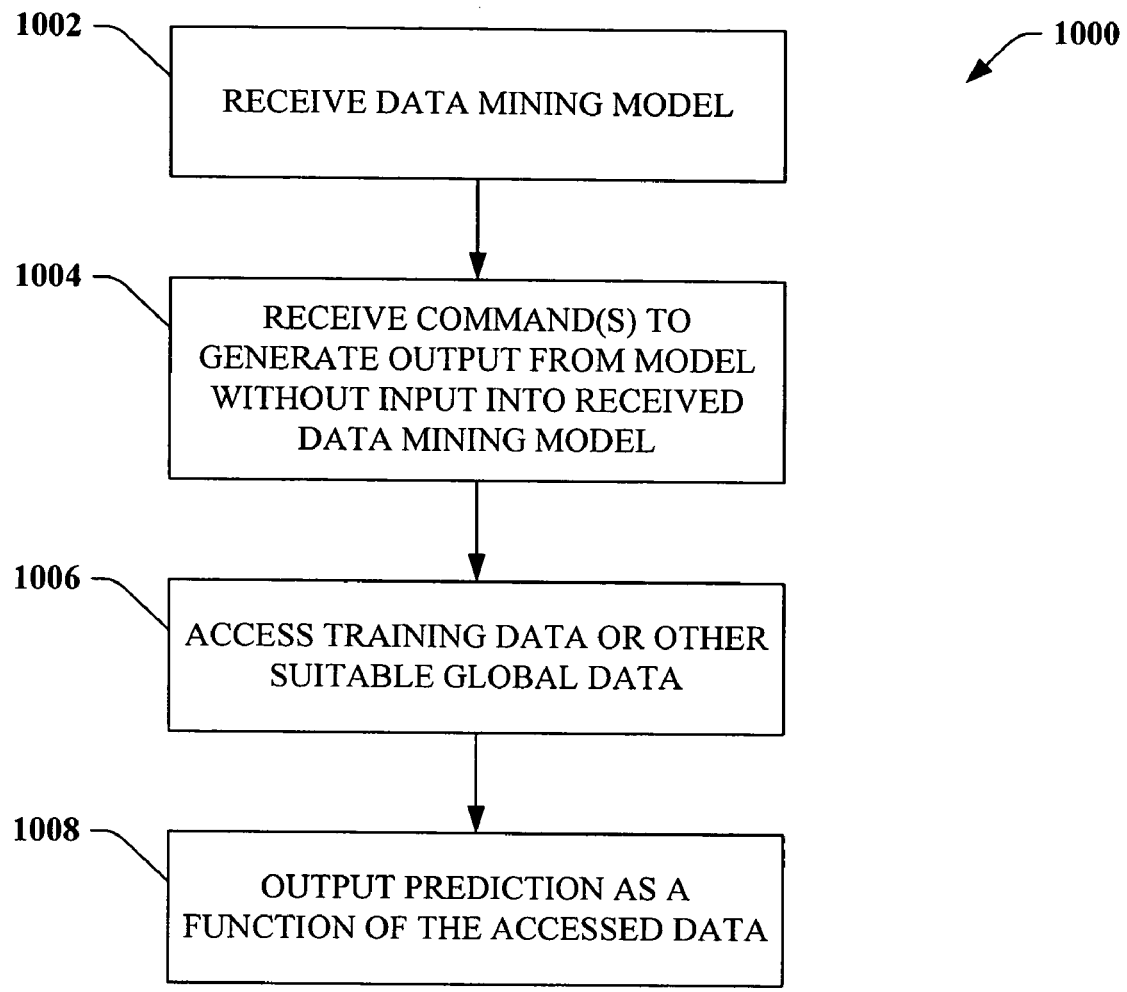
FIG. 10 is a flow diagram illustrating a methodology for causing a data mining model to output a prediction using training data and global statistics associated therewith in accordance with an aspect of the subject invention.
Figure 11:
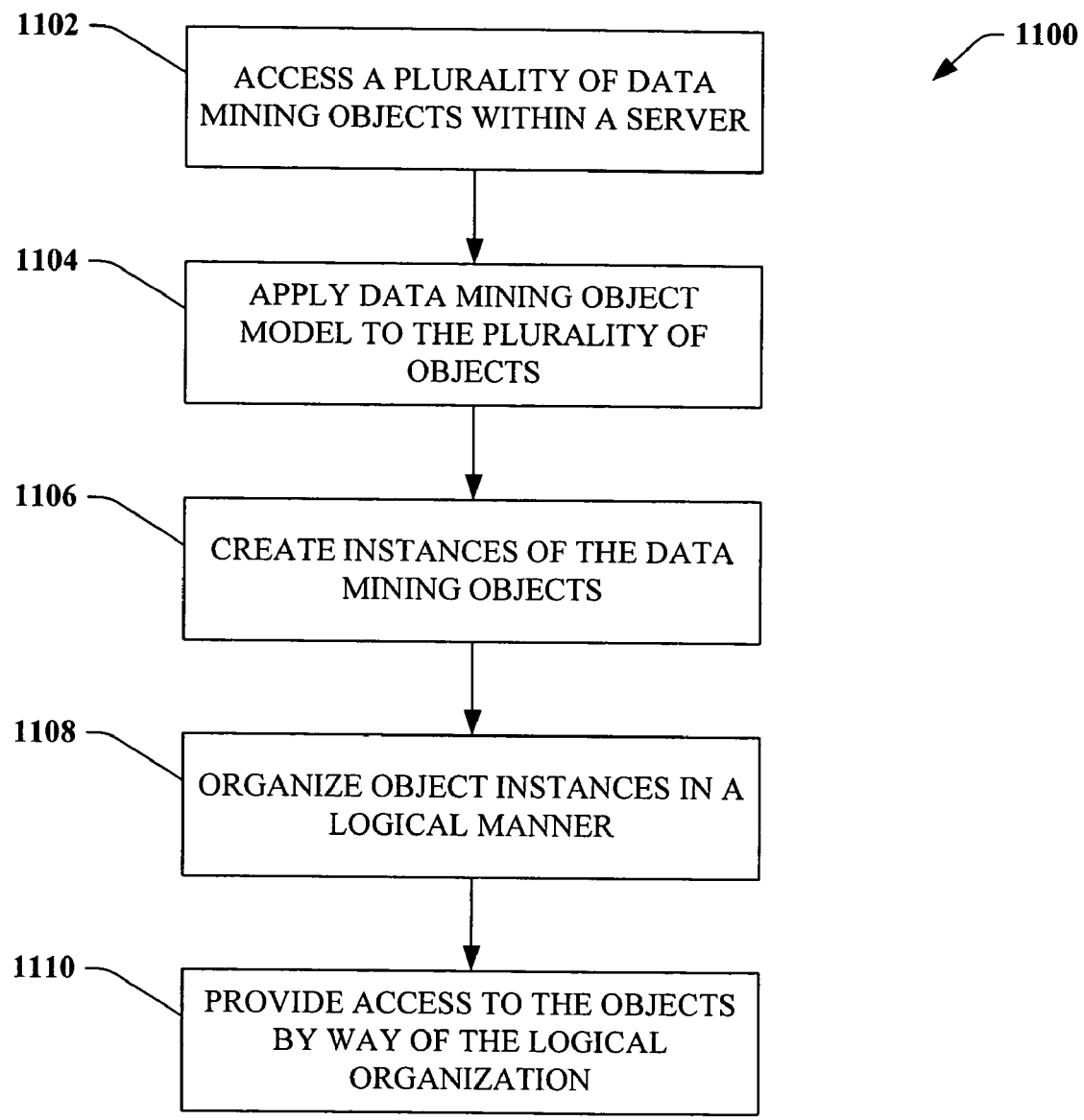
FIG. 11 is a flow diagram illustrating a methodology for enabling logical access to content of a data mining model by way of a data mining object model in accordance with an aspect of the subject invention.

Now turning to FIG. 10, a methodology 1000 for generating an output from a data mining model without providing input data beyond training data and global statistics associated therewith is illustrated. There are many situations, described supra, where such output without prediction input is desirable. At 1002, a data mining model is received. For instance, the data mining model can be utilized to generate predictions relating to sequence of events, predictions relating to time-series, predictions relating to associations, learned content, or any other suitable output by a data mining model. At 1004, commands to generate an output from a data mining model without input (beyond training data and global statistics associated therewith) are received. In one example, the commands can be received in a declarative language, such as, for example, DMX.

At 1006, the data mining model to generate the output is provided access to training data and/or global statistics associated therewith. Thus, for example, in an instance of time-series analysis, only historical data is necessary and utilized by the data mining model, and therefore the data mining model does not need to be provided with superfluous input data. Rather, the commands can effectuate generation of output from a data mining model (e.g., a predictive output) without the aforementioned input data. At 1008, the data mining model creates an output as a function of the accessed training data and/or global statistics. For instance, the output can be a prediction relating to a next event, an association, or any other suitable prediction/output. Similarly, the data mining model can output patterns learned from the training data and/or global statistics associated therewith.

Now referring to FIG. 1, a methodology 1100 for utilizing a data mining object model to provide access to content (knowledge) relating to data mining models is illustrated. For instance, it may be desirable to perform operations or analysis on content of a data mining model upon a server and then deliver results of such operations/analysis to a client application in order to reduce network traffic (and possibly reduce computation time required for the operations/analysis). At 1102, a plurality of data mining objects are accessed within a server system. The objects can relate to content of the data mining model, structure of the data mining model, and the like. At 1104, a data mining object model is applied to the plurality of data mining objects, thereby enabling instances of such objects to be arranged in a logical manner. More particularly, at 1106, instances of the data mining objects are created, and at 1108 such object instances are arranged in a logical manner. In accordance with one aspect of the subject invention, the object instances can be arranged hierarchically. At 1110, access can be provided to the objects by way of the logical organization of the object instances. Thus, a developer can access learned content of a data mining model on a server, manipulate and review the learned content on the server, and return only desirable data to a client application for review by the developer.

Figure 12:
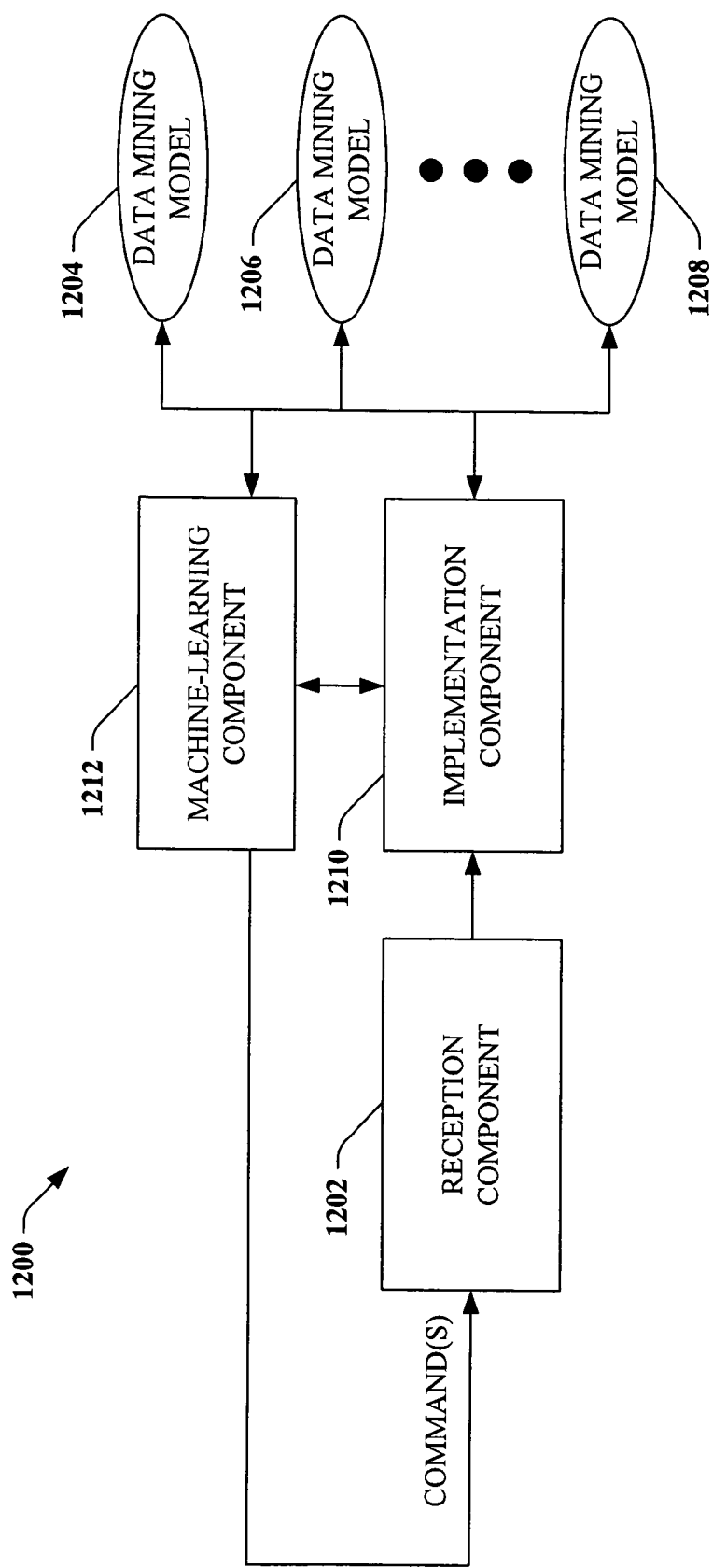
FIG. 12 is a block diagram of a system that facilitates implementing one or more declarative statements in connection with data mining in accordance with an aspect of the subject invention.

Now referring to FIG. 12, a system 1200 that facilitates data mining applications is illustrated. The system 1200 includes a reception component 1202 that receives commands relating to one or more data mining models 1204-1208. For instance, the commands can relate to interconnecting two or more of the data mining models 1204-1208, generating a prediction from one or more of the data mining models without utilizing predictive input, a general prediction command that can generate appropriate prediction types as a function of the data models 1204-1208, performing server-side operations on content of the data mining models 1204-1208, visualizing data mining content on a client, or the like.

The commands can then be delivered to an implementation component 1210, that, as described above, can implement the commands with respect to the data mining models 1204-1208. The system further includes a machine-learning component 1212 that can be employed to automatically and/or semi-automatically generate commands received by the reception component 1202. In particular, the machine-learning component 1212 can make inferences regarding commands and/or generate a visualization of outputs of the data mining models 1204-1208. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In one example, the machine-learning component 1212 can watch the implementation component 1210 in connection with the data mining models 1204-1208 over time and "learn" different visualizations preferred by a user given disparate contexts of the user. For instance, a developer may prefer a first visualization with respect to a prediction or output relating to the data mining model 1204 and may prefer a second visualization with respect to a prediction or output relating to the data mining model 1206. Further, these different visualization preferences may depend upon time of day, day of week, user location, or other suitable contextual data. Therefore, the machine-learning component 1212 can assist in generating commands relating to visualizing output from one or more of the data mining models 1204-1208. In another example, as described herein, a developer can cause an interconnection of two or more of the data mining models 1204-1208. Given disparate interconnections, a developer may wish to review output thereof in different manners. The machine-learning component 1212 can watch implementation of these visualization commands and make inferences regarding operation of the system 1200. For instance, the machine-learning component can weigh costs of generating an incorrect inference against benefits of correctly predicting a desired command. Various metrics can be employed to make such probabilistic determination.

Now referring to FIG. 13, an exemplary data mining object model 1300 is illustrated, wherein such object model can be employed in accordance with various aspects of the subject invention. In particular, the data mining object model 1300 provides an application developer with an object model to program against. For instance, with respect to data mining applications, the data mining object model 1300 can expose data mining model content data as a hierarchy of objects such as cubes, dimensions, cells, members, and the like. The data mining model 1300 provides a user-friendly model for traversing data mining model content (knowledge).

The data mining object model 1300, for instance, can include a mining structure object 1302 that encapsulates properties from an owning structure (a mining structures object 1304, a mining model object 1306, and a mining models object 1308). A description can be stored on a server relating to the mining structure object 1302. The mining structure object 1302 can be associated with data that is indicative of the population of the model. For instance, the data can indicate whether the model is populated (e.g., an empty model can be associated with a defined structure but not trained with training data). The mining structure object 1302 can be further associated with a mining structure columns object 1310 that indicates a number of columns associated with a data mining model. In accordance with another aspect of the subject invention, the mining structures object 1304 can be associated with the mining models object 1308, wherein the mining models object 1308 specifies a set of nodes within a data mining model (not shown).

A mining structure column object 1312 encapsulates properties from a parent structure, and a description of such can be stored upon a server. The mining structure column object 1312 can be associated with a particular data type as well as a content type (e.g., discrete, continuous, . . . ). The mining structure column object 1312 can also be associated with disparate objects and/or have data embedded therein that indicate possible values for the column, whether there are nested columns (and content thereof), properties in terms of attribute value pairs, and other suitable data/objects.

The mining model object 1306 within the exemplary data mining object model 1300 encapsulates properties from the owning structure (e.g., the mining models object 1308). Within the mining model object 1306, an object name can exist as well as a description thereof (which can be stored on a server). Further, a provider-specific name can be associated with the mining model object 1306 that describes an algorithm that is utilized to generate the model. Furthermore, similar to the mining structures object 1304, the data mining model object 1306 includes data indicative of whether a corresponding data mining model is populated. In accordance with another aspect of the subject invention, the mining model object 1306 can include indicia regarding whether the corresponding data mining model allows drill-through.

A mining model columns object 1314 is associated with the mining model object 1306, and can indicate how many columns are in the model, data types of the columns, content of the columns, and the like. Furthermore, a mining model column object 1316 can specify names and parameters of individual columns associated with the data mining model. In particular, the mining model column object 1316 can be associated with a mining model column values object 1318 as well as a mining model column value object 1320. Accordingly, a developer could quickly browse hierarchically through the mining model object 1306 to the mining model column value object 1320 and perform modifications/operations on any suitable object within the hierarchy. The mining model column object 1316 can be associated with a description thereof (which can be stored on a server), a data type associated with a column, a content type of the column, time stamps relating to a time the object was last updated, and other suitable data. The mining model object 1306 is further associated with a mining model parameters object 1322, which can be utilized to provide access to model and algorithm-specific parameters. A mining model parameter object 1324 can further specify a singular or collection of parameters associated with a data mining model, and can encapsulate properties of owning structures. For instance, the mining model parameter object 1324 can include a parameter name as well as a parameter value. A mining content nodes object 1326, a mining content node object 1328, and a mining content distribution object 1330 can specify a set of nodes within the model's content in a hierarchical fashion. For instance, viewing content of a data mining model as a collection of node objects is similar to obtaining members in online analytical processing (OLAP) applications, in the sense that they are available as a schema rowset as well. The mining content node object 1328 can be associated with significant information relating to content of a data mining model, including an object name, a unique name, name of attributes in a node represented by the mining content node object 1328, probability for reaching the node, probability of reaching the node from a parent node, number of cases in support of the node, a description of the mining content node object 1328 (which can be stored on a server), a rule associated with the node represented by the object, an XML description of the rule moving the node from the parent node, a parent node in a content tree, and the like. Moreover, the mining content node object 1328 can include data indicating existence and location of ancestors of the node, children of the node, siblings of the node, descendants of the node, and the like. The mining content distribution object 1330 can indicate distribution of attributes at this node.

In particular, the mining content distribution object 1330 can be associated with an attribute name, an attribute value, a number of cases supporting the attribute value, a probability of occurrence of the attribute value, a variance of the attribute value, number of cases in support of the aforementioned node, and the value type of the attribute. For example, the value type can indicate whether there is a missing value associated with the attribute, an existing value associated with the attribute, whether the value type of the attribute is continuous, discrete, discretized, or the like, and any other suitable value type.

A mining service object 1332 represents an available mining algorithm from a list of available mining algorithms represented by a mining services object 1334. The mining service object 1332 can be associated with a mining service parameters object 1336 and a mining service parameter object 1338, which includes data indicative of available algorithm parameters. A mining content node set object 1340 is associated with a mining content nodes object 1342 and a mining content node object 1344 that are substantially similar to the mining content nodes object 1326 and the mining content node object 1328 associated with the mining model object 1306. The data mining object model 1300 can further include a context object 1346 that can provide data indicative of a current and/or past context of a corresponding data mining model. A connection object 1348 can indicate whether a connection has been made to the data mining model upon a server. A command object 1350 can represent procedures operable on content of the data mining model, and a root object 1352 can provide access to the data mining object model 1300.

Figure 14:
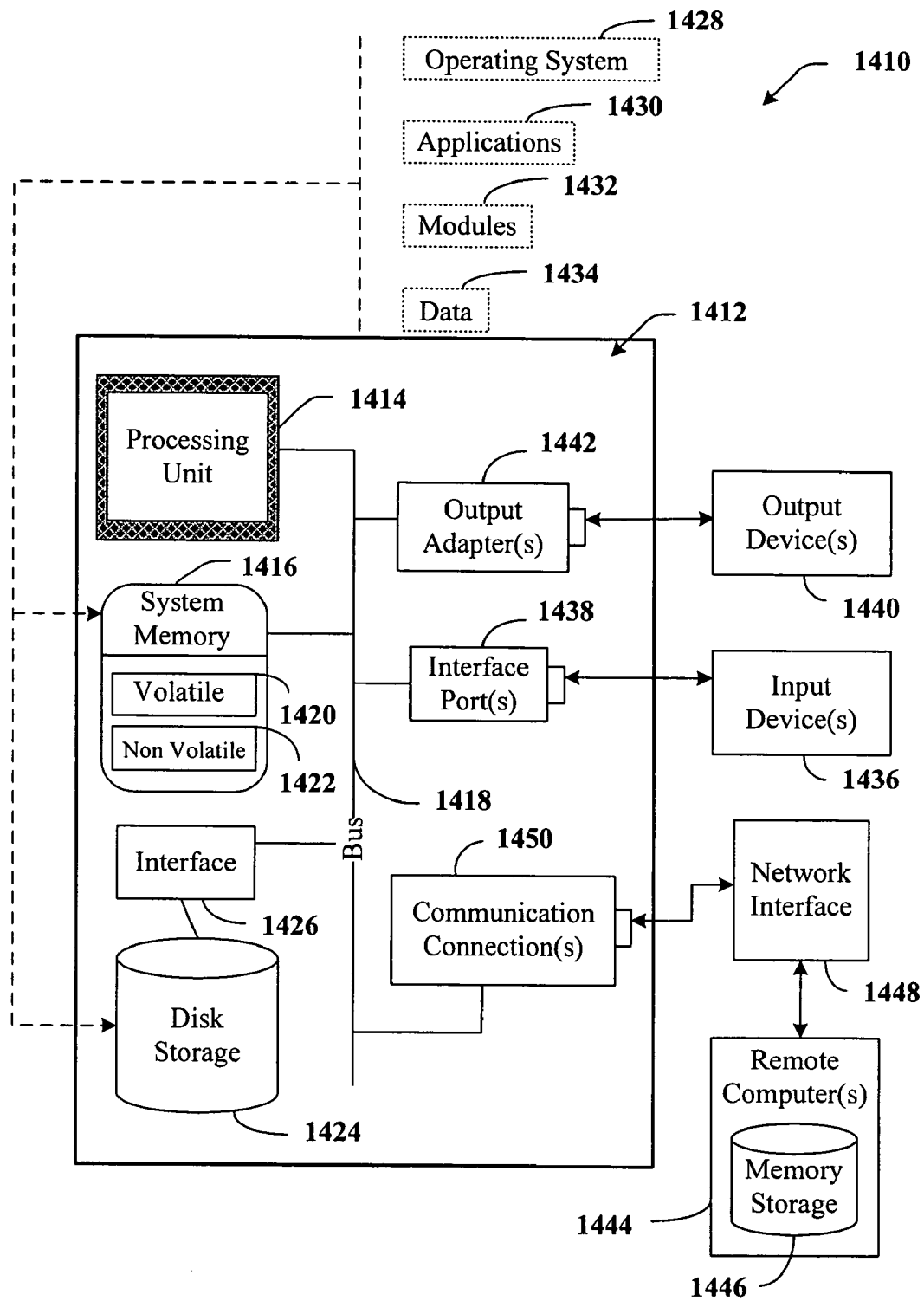
FIG. 14 is an exemplary computing environment that can be utilized in connection with the subject invention.

In order to provide additional context for various aspects of the subject invention, FIG. 14 and the following discussion are intended to provide a brief, general description of a suitable operating environment 1410 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
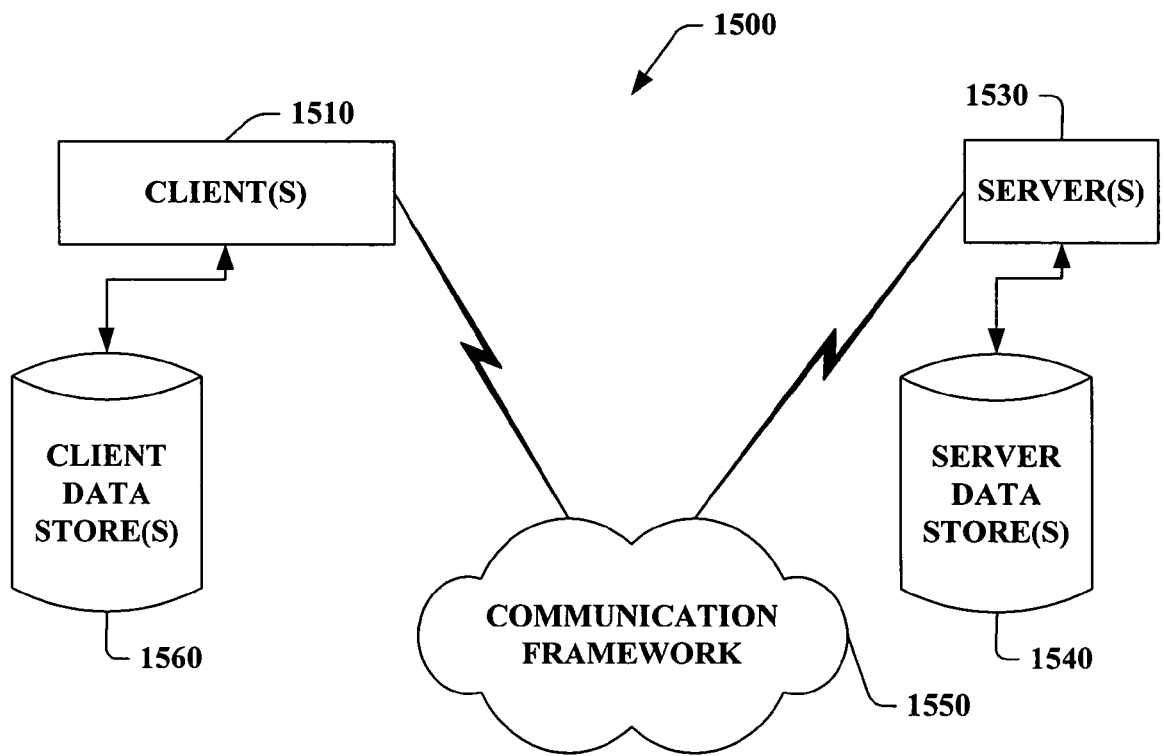
FIG. 15 is an exemplary operating environment that can be employed in connection with the subject invention.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the subject invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data mining comprising a computer processor for executing the following software components, the system is recorded on a computer-readable storage medium and capable of execution by a computer, comprising:
    a reception component that receives command(s) in a declarative language that relate to communicatively coupling together two disparate data mining models via utilizing an output of a first data mining model as an input to a second data mining model; and
    an implementation component that analyzes the received command(s) and implements the command(s) with respect to the first and second data mining models;
    wherein the reception component receives further command(s) in a declarative language with respect to causing one or more of the first and second data mining models to output a prediction, the prediction generated without prediction input, the implementation component causes the one or more of the first and second data mining models to output the prediction utilizing training data and global statistics associated therewith; and
    wherein the declarative language is Data Mining Extensions (DMX).

2. The system of claim 1, the reception component receives further command(s) in a declarative language with respect to causing a prediction to be output from one or more of the first and second data mining models, the command(s) are a singular command that can cause output of a plurality of prediction types, the implementation component analyzes the one or more of the first and second data mining models and causes a prediction to be generated with a prediction type that corresponds to the analysis of the one or more of the first and second data mining models.

3. The system of claim 2, the prediction type is related to one or more of a time-series prediction, a sequential prediction, an associative prediction, and a regression prediction.

4. The system of claim 1, the received command(s) are generated by a user.

5. The system of claim 1, the received command(s) are generated by a computer component.

6. The system of claim 1, the implementation component implements the command(s) upon a server, a result of the implementation returned to a client.

7. The system of claim 1, the command(s) received and implemented by way of a data mining object model.

8. A method that facilitates data mining, comprising:
    receiving a first data mining model;
    receiving command(s) in a declarative language that relate to communicatively coupling together two disparate data mining models via utilizing an output of the first data mining model as an input to a second data mining model;
    analyzing the received command(s) and implementing the command(s) with respect to the first and second data mining models;
    receiving further command(s) in a declarative language with respect to causing one or more of the first and second data mining models to output a prediction, the prediction generated without prediction input, wherein the command(s) enable the first and second data mining models to utilize only training data and global statistics associated therewith in connection with generating the prediction, and wherein the declarative language is Data Mining Extensions (DMX); and
    generating the prediction upon receipt of the command(s).

9. The method of claim 8, the declarative language is based at least in part upon Structured Query Language (SQL).

10. The method of claim 8, the generated prediction is a time-series prediction.

11. The method of claim 8, the generated prediction is an associative prediction.

12. The method of claim 8, further comprising:
    analyzing parameters associated with the data mining model; and
    determining a prediction type as a function of parameters associated with the data mining model.

13. The method of claim 12, further comprising analyzing data type associated with the data mining model.

14. A system that facilitates data mining comprising a computer processor for executing the following software components, the system is recorded on a computer-readable storage medium and capable of execution by a computer, comprising:
    means for reviewing content of a data mining model by way of a data mining object model;
    means for performing operations upon the content of the data mining model at a sewer that stores the data mining model;
    means for receiving command(s) in a declarative language that relate to communicatively coupling together two disparate data mining models via utilizing an output of a first data mining model as an input to a second data mining model;

means for analyzing the received command(s) and implementing the command(s) with respect to the first and second data mining models;

means for receiving further command(s) in a declarative language that cause the first and second data mining models to output a prediction, the prediction generated without prediction input, wherein the command(s) enable the first and second data mining models to utilize training data and global statistics associated therewith in connection with generating the prediction, and wherein the declarative language is Data Mining Extensions (DMX); and means for generating the prediction upon receipt of the command(s).

15. The system of claim 14, further comprising means for delivering results of the operation from the server to a client application.

16. The system of claim 14, further comprising means for generating a graphical rendering of the operation at a client computer.

* * * * *